US009002759B2

(12) United States Patent
Hodjat et al.

(10) Patent No.: US 9,002,759 B2
(45) **Date of Patent: *Apr. 7, 2015**

(54) DATA MINING TECHNIQUE WITH MAINTENANCE OF FITNESS HISTORY

(75) Inventors: Babak Hodjat, Dublin, CA (US); Hormoz Shahrzad, Dublin, CA (US)

(73) Assignee: Sentient Technologies (Barbados) Limited, Belleville (BB)

( * ) Notice: Subject to any disclaimer, the term of this patent is extended or adjusted under 35 U.S.C. 154(b) by 520 days.

This patent is subject to a terminal disclaimer.

(21) Appl. No.: 13/358,381

(22) Filed: Jan. 25, 2012

(65) Prior Publication Data

US 2013/0124440 A1 May 16, 2013

Related U.S. Application Data

(60) Provisional application No. 61/559,595, filed on Nov. 14, 2011.

(51) Int. Cl.

| | |
|---|---|
| ***G06N 3/00*** | (2006.01) |
| ***G06N 3/12*** | (2006.01) |

(52) U.S. Cl.
CPC .................................... *G06N 3/126* (2013.01)

(58) Field of Classification Search
None
See application file for complete search history.

(56) References Cited

U.S. PATENT DOCUMENTS

| | | | | |
|---|---|---|---|---|
| 8,527,433 | B2 * | 9/2013 | Hodjat et al. | 706/12 |
| 2009/0125370 | A1 * | 5/2009 | Blondeau et al. | 705/9 |
| 2010/0274736 | A1 * | 10/2010 | Hodjat et al. | 705/36 R |
| 2010/0274742 | A1 * | 10/2010 | Hodjat et al. | 706/10 |
| 2010/0293119 | A1 | 11/2010 | Ferringer et al. | |
| 2012/0239517 | A1 * | 9/2012 | Blondeau et al. | 705/26.1 |
| 2013/0124440 | A1 * | 5/2013 | Hodjat et al. | 706/13 |
| 2013/0254142 | A1 * | 9/2013 | Hodjat et al. | 706/12 |
| 2014/0006316 | A1 * | 1/2014 | Hodjat et al. | 706/10 |

OTHER PUBLICATIONS

Laumanns, Marco et al.; "A Unified Model for Multi-Objective Evolutionary Aigorithms with Elitism"; 2000; IEEE; pp. 46-53.
Ahn, Chang Wook et al.; "Elitism-Based Compact Genetic Algorithms"; 2003; IEEE; Transactions on Evolutionary Computation, vol. 7, No. 4; pp. 367-385.

(Continued)

*Primary Examiner* — Jeffrey A Gaffin
*Assistant Examiner* — Paulinho E Smith
(74) *Attorney, Agent, or Firm* — Haynes Beffel & Wolfeld LLP; Warren S. Wolfeld

(57) ABSTRACT

Roughly described, a data mining system includes a candidate gene database in which each candidate individual has a respective fitness estimate. A gene pool processor tests individuals from the candidate gene pool on training data and updates the fitness estimate of the individuals. A gene harvesting module deploys selected individuals from the gene pool. The gene pool processor includes a competition module which selects individuals for discarding in dependence upon their updated fitness estimate. The system maintains a fitness training history for each of the candidate individuals, identifying the data samples on which the individual has been tested. The historical information can be used to assist in any one or more of the following: competition among the individuals, avoiding re-testing of an individual on the same data sample, removing duplicate test data before merging fitness evaluations, improving gene pool diversity, and selecting individuals for deployment.

53 Claims, 11 Drawing Sheets

(56) References Cited

OTHER PUBLICATIONS

Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.
Hornby, G.S., "A Steady-State Version of the Age-Layered Population Structure EA," Chapter 1 of Genetic Programming Theory and Practice VII, Riolo et al., editors, Springer 2009, 16pp.
Hornby, G.S., "Steady-State ALPS for Real-Valued Problems," GECCO'09, Montreal, Jul. 2009, Assoc. for Computing Machinery, 8pp.
idesign lab, "ALPS—the Age-Layered Population Structure," UC Santa Cruz web article printed Mar. 17, 2011, 3 pp. (http://idesign.ucsc.edu/projects/alps.html).
A. Bongard, J. C. and Hornby, G. S., Guarding Against Premature Convergence while Accelerating Evolutionary Search. In GECCO'10: Proceedings of the 12th annual conference on Genetic and Evolutionary Computation, pp. 111-118 (2010).
Mouret J-B et al., "Encouraging Behavioral Diversity in Evolutionary Robotics: An Empirical Study," MIT, Evolutionary Computation 20(1):91-133, 2012.
Refaeilzadeh P, et al., "Cross Validation" entry, Encyclopedia of Database Systems, eds. Özsu and Liu, Springer, 2009, 6pp.
Pending U.S. Appl. No. 13/184,307, filed Jul. 15, 2011 entitled "Data Mining Technique with Experience-Layered Gene Pool," 47pp.

* cited by examiner

INDIVIDUAL
310

| | INDIVIDUAL ID | EXPERIENCE | FITNESS | FITNESS TRIAL HISTORY | |
|---|---|---|---|---|---|
| RULE 1 | P/V 1.1 | P/V 1.2 | ... | P/V 1.M | OUTPUT 1 |
| RULE 2 | P/V 2.1 | P/V 2.2 | ... | P/V 2.M | OUTPUT 2 |
| RULE 3 | P/V 3.1 | P/V 3.2 | ... | P/V 3.M | OUTPUT 3 |
| RULE 4 | P/V 4.1 | P/V 4.2 | ... | P/V 4.M | OUTPUT 4 |
| RULE 5 | P/V 5.1 | P/V 5.2 | ... | P/V 5.M | OUTPUT 5 |

312 — INDIVIDUAL ID
314 — EXPERIENCE
316 — FITNESS
318 — RULE column
320 — P/V column
322 — OUTPUT column
324 — FITNESS TRIAL HISTORY

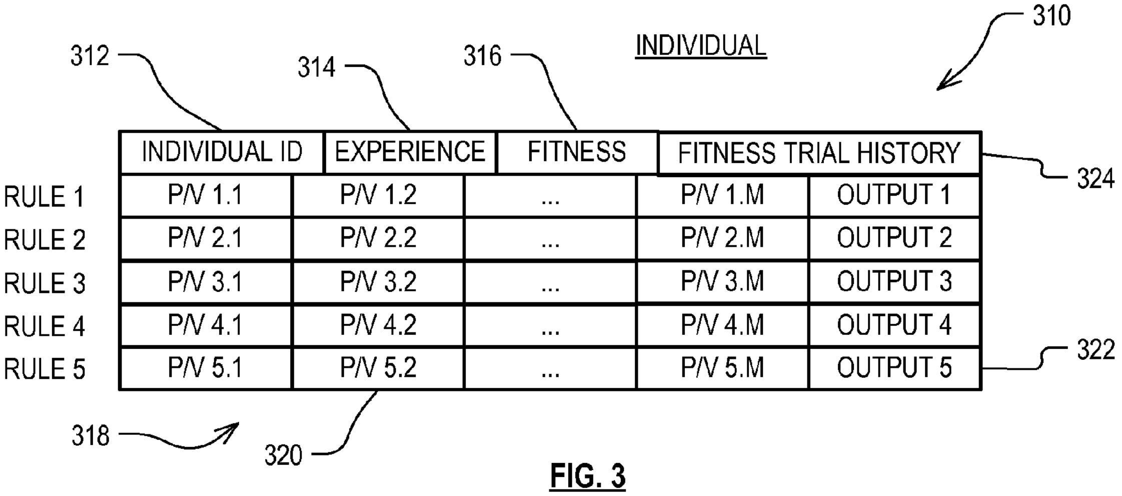

FIG. 3

TRAINING DATA
114

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

410

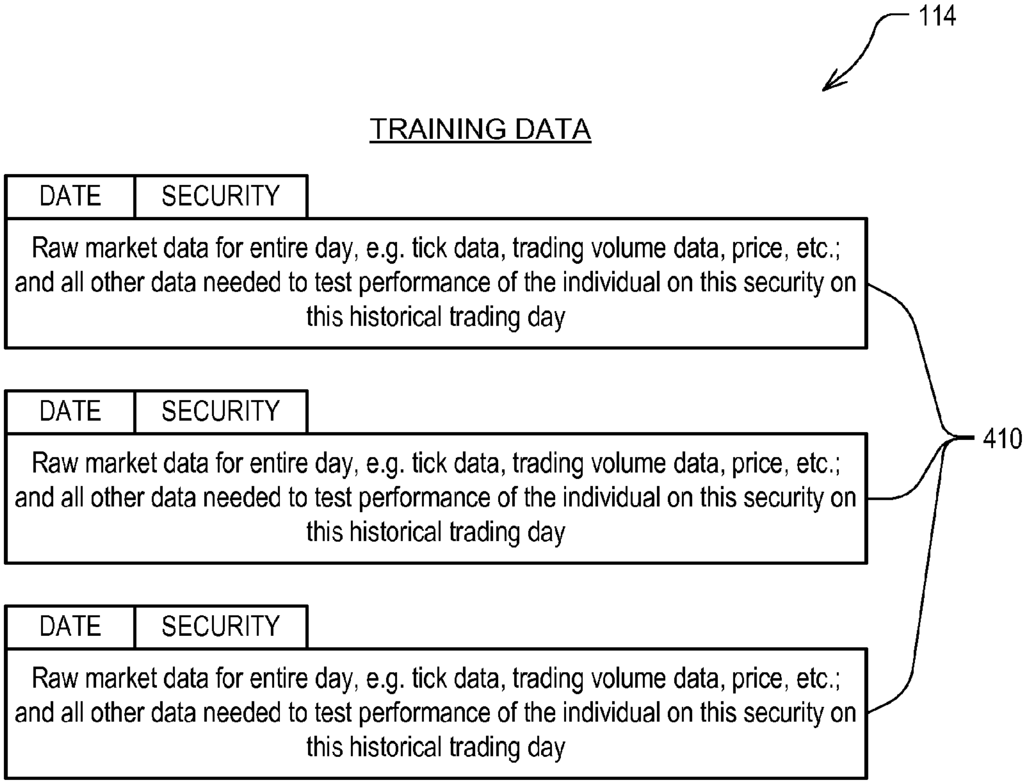

FIG. 4

FITNESS TRIAL HISTORY

| SAMPLE ID | PERFORMANCE |
| --- | --- |
| | |
| | |
| | |
| | |
| | |
| ⋮ | ⋮ |
| | |

FIG. 3A

COMPETITION MODULE

DATA MINING TECHNIQUE WITH MAINTENANCE OF FITNESS HISTORY

CROSS-REFERENCE TO OTHER APPLICATIONS

Applicants hereby claim the benefit under 35 U.S.C. 119(e) of U.S. provisional application No. 61/559,595, filed 14 Nov. 2011. The provisional application is hereby incorporated by reference herein for its teachings.

In addition, U.S. patent application Ser. No. 13/184,307, filed 15 Jul. 2011, entitled "DATA MINING TECHNIQUE WITH EXPERIENCE-LAYERED GENE POOL", is incorporated herein for its teachings.

BACKGROUND

The invention relates generally to data mining, and more particularly, to the use of genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms have been applied to all of the above-mentioned environments. With respect to stock categorization, for example, according to one theory, at any given time, 5% of stocks follow a trend. Genetic algorithms are thus sometimes used, with some success, to categorize a stock as following or not following a trend.

Evolutionary algorithms, which are supersets of Genetic Algorithms, are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

A common problem with evolutionary algorithms is that of premature convergence: after some number of evaluations the population converges to local optima and no further improvements are made no matter how much longer the algorithm is run. In one of a number of solutions to this problem, known as the Age-Layered Population Structure (ALPS), an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool).

When using genetic algorithms to mine a large database, it may not be practical to test each individual against the entire database. The system therefore rarely if ever knows the true fitness of any individual. Rather, it knows only an estimate of the true fitness, based on the particular subset of data samples on which it has actually been tested. The fitness estimate itself therefore varies over time as the individual is tested on an increasing number of samples. It is in this kind of environment that embodiments of the present invention reside.

SUMMARY

In the above-incorporated "DATA MINING TECHNIQUE WITH EXPERIENCE-LAYERED GENE POOL" application, a computer-implemented evolutionary data mining system includes a memory storing a candidate gene database in which each candidate individual has a respective fitness estimate; a gene pool processor which tests individuals from the candidate gene pool on training data and updates the fitness estimate associated with the individuals in dependence upon the tests; and a gene harvesting module providing for deployment selected ones of the individuals from the gene pool, wherein the gene pool processor includes a competition module which selects individuals for discarding from the gene pool in dependence upon, among other things, their updated fitness estimate. Accommodations are made to account for the incompleteness of fitness testing of various individuals at the time they are competing with each other.

Applicants have recognized, however, that a wealth of information is also contained within the history of the separate fitness trials to which the individuals have been subjected, and which is lost when the results of all the trials are consolidated into a single overall fitness estimate. This information can be used to great advantage in a number of ways. For example, simply a record of the particular data samples on which an individual has already been tested, can be used to avoid wasteful re-testing the individual on the same data sample. As another example, in an embodiment in which an individual may be tested on different sets of data samples which might overlap, a record of the particular data samples in each sample set can be used to remove duplicates before merging the fitness evaluations, thereby improving the validity of the overall fitness evaluation.

As another example, individuals can be compared based not only on their overall fitness evaluations, but also on the way they reached their overall fitness evaluations. For example, in some applications individuals may be favored or disfavored based on their consistency of performance over many samples. Consistency can be measured by statistical means, such as by standard deviation, variance, or maximum deviation of the individual's performance on individual data samples. In applications where data samples are ordered, such as time-ordered data, individuals may be favored or disfavored that took fewer risks over time, or experienced fewer or shorter or shallower periods of weak or negative performance over time. These characteristics can be evaluated by reference to the individual's performance on sample data spread over time. Still further, in ordered data applications, an overall fitness estimate can be weighted to emphasize gene's fitness on samples considered more relevant to the production data. For example, for time sequential samples, where production data will be provided in real time, it may be desirable to emphasize the performance of individuals on more recent sample data.

Fitness trial history can be taken account during training in a number of ways. In one example, each individual's fitness estimate can be weighted, for purposes of the comparisons with that of other individuals, according to the favored or disfavored historical characteristic. In an embodiment, such weighting occurs only for individuals that have already reached a predetermined testing experience level. In another example, an individual's historical characteristics can be used to help improve diversity in the gene pool by selecting individuals for discarding whose trial-by-trial performance is very similar to that of another individual.

In yet another example, an individual's historical characteristics can be considered when filtering the final pool of genotypes for selection for deployment. Still other ways in which a fitness trial history can be used will now be apparent to the reader.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 3 is a symbolic drawing of an individual in either the candidate gene pool or the production gene population of FIG. 1.

FIG. 3A is a symbolic drawing of a fitness trial history of an individual in either the candidate gene pool or the production gene population of FIG. 1.

FIG. 4 is a symbolic drawing indicating how the training data database is organized.

DETAILED DESCRIPTION

Figure 1:
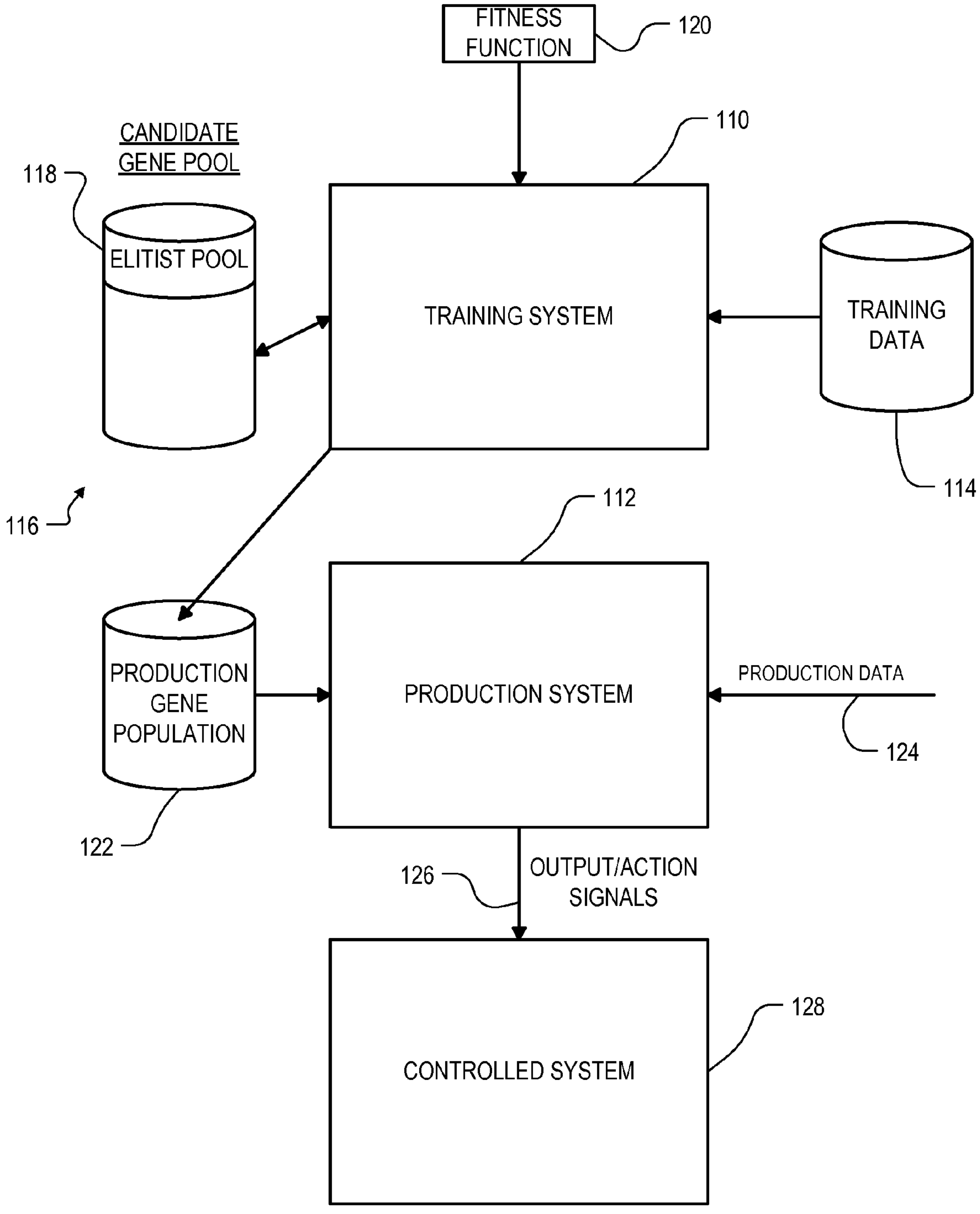
FIG. 1 is an overall diagram of an embodiment of a data mining system incorporating features of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a healthcare environment, the individual can be used to point out patterns in diagnosis and treatment data which should be studied more closely as likely either improving or degrading a patient's diagnosis. In a financial assets trading environment, the individual can be used to detect patterns in real time data and assert trading signals to a trading desk. The action signals from an individual can be transmitted to the appropriate controlled system for execution.

One difference between the data mining environments of the embodiments described herein, and many other environments in which evolutionary algorithms can be applied, is that the fitness of a particular individual in the data mining environment usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues. This means that if an individual is "lucky" early on, in the sense that the first set of samples that it was given for testing happened to have been in some sense "easy", then after only the first set of samples the individual will appear to be fitter than it actually is. If compared to other individuals that have much more experience, lucky individuals could displace individuals whose fitness estimates are lower but more realistic. If care is not taken, therefore, the algorithm will optimize for individuals that are lucky early on, rather than their actual fitness.

A solution to this problem, implemented in certain embodiments described herein but not required for all embodiments of the present invention, is to consider individuals for the elitist pool only after they have completed testing on a predetermined number of samples, for example 1000 samples. Once an individual has reached that minimum threshold experience level, comparisons with other individuals are considered valid and can compete on the basis of fitness for a place in the elitist pool. Such competition can take account of each individual's fitness trial history as previously described.

However, the argument that high fitness values of individuals with less experience and could be due to luck rather than true fitness, also applies, though to a lesser degree, even to individuals within the elitist pool. That is, if compared to other individuals that have much more experience, younger, luckier individuals that have already entered the elitist pool could still displace individuals whose fitness levels are lower but more realistic. Again, allowing such individuals to compete against each other solely on the basis of fitness would continue to optimize for individuals that are lucky. The same solution can be applied to avoid this problem: divide the elitist pool into two layers on the basis of experience level. For example, layer 1 ($L_1$) may include only those individuals that have been tested on 1000-1999 samples, while a layer 2 ($L_2$) includes all individuals that have been tested on 2000 or more samples. Individuals compete only against other individuals within the same experience layer.

It will be appreciated that the tendency to optimize for lucky individuals still remains, within each layer, though to a still lesser degree. A solution is again the same: add more layers until the tendency to optimize for lucky individuals is reduced to a level sufficiently small for the particular application. In the extreme, each layer contains only those individuals having a single experience level, meaning only individuals that have been tested on exactly the same number of samples can compete against each other. This extreme may not be practical, however, as it can require a large amount of memory to maintain. Thus for a particular application, there will be an appropriate number of layers which minimizes the tendency to optimize for lucky individuals, yet remains practical to implement.

In general, in embodiments herein, the elitist pool contains T layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designed layer 0 ($L_0$). Each i'th one of the layers in $[L_0 \ldots L_{T-1}]$ contains only individuals with a respective range of testing experience $[\text{ExpMin}(L_i) \ldots \text{ExpMax}(L_i)]$, each $\text{ExpMin}(L_{i+1}) > \text{ExpMax}(L_i)$. The minimum experience level of the bottom layer $L_0$ is 0, and the top layer $L_T$ has a minimum experience level $\text{ExpMin}(L_T)$ but no maximum experience level. Preferably, the experience ranges of contiguous layers are themselves contiguous, so that $\text{ExpMin}(L_{i+1}) = \text{ExpMax}(L_i)+1$, for $0 <= i < T$. Note that testing experience level is a significantly different basis on which to stratify individuals in an elitist pool than age in the sense of ALPS.

In an embodiment, each layer i in the elitist pool (i.e. in layers $[L_4 \ldots L_T]$) is permitted to hold a respective maximum number of individuals, $\text{Quota}(L_i)$. The quota is chosen to be small enough to ensure competition among the individuals within the corresponding range of experience levels, but large enough to ensure sufficient diversity among the fit individuals that graduate to the next higher layer. Preferably the quota of each such layer is fixed, but in another embodiment it could vary. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually graduate to the next higher experience layer. If the next higher experience layer is not yet full, then the individual is added to that layer. If it is full, then the individual has to compete for its place in that layer. If it is fitter than the least fit individual in that layer, it will be accepted into that layer and the least fit individual will be discarded. If not, then the graduating individual will be discarded and the individuals in the next higher layer will be retained.

Either way, a space is opened in the current experience layer (the layer from which the individual is graduating). The open space means that the next individual graduating into the current experience layer from below will be accepted without having to compete for its place—thereby defeating a purpose of the elitist pool. To mitigate this problem, an embodiment introduces the concept of an elitist pool minimum fitness, which in one embodiment is set to the minimum fitness of the top layer. The individuals in the top layer are assumed to have a relatively accurate estimate of their fitness, and since after the top layer is full the goal of the evolutionary algorithm is to identify individuals that are better than the ones already there, it makes sense to avoid devoting resources to individuals which already appear to be inferior. Thus in the embodiment, once the elitist pool minimum fitness is set, any individual being considered into the elitist pool can only be added if it has a fitness value above the elitist pool minimum fitness. Stated differently, once the top layer $L_T$ is full, individuals are not allowed to enter $L_1$ unless their fitness level is at least as high as the minimum fitness $\text{FitMin}(L_T)$ of the top layer $L_T$.

In an embodiment, the elitist pool minimum fitness is not established until the top layer is full. Otherwise, if the earliest entrants into the top layer happen to have excellent fitness, they will block other entrants which might be needed for diversity.

It will be appreciated that since the fitness estimate of individuals is still somewhat uncertain at the time they are being considered for entry into the elitist pool from $L_0$, establishing the minimum entry fitness at exactly $\text{FitMin}(L_T)$ may cull individuals that eventually would have been determined to have an actual fitness which exceeds $\text{FitMin}(L_T)$. In another embodiment, therefore, the minimum fitness for entry into the elitist pool is set at some other fitness level which is a function of $\text{FitMin}(L_T)$. For example, it can be set at 90% of $\text{FitMin}(L_T)$. It will also be appreciated that the accuracy of an individual's fitness estimate improves as the individual progresses up through the experience layers. Another embodiment, therefore, reduces the potential inaccuracy of the elitist pool minimum fitness test by applying it at the entry to one of the higher layers in the elitist pool, rather than at $L_0$. In yet another embodiment, the test is applied more than once, at the entry to more than one of the layers, or all of them. Other variations will be apparent. In general, in embodiments which attempt to cull unfit individuals early, individuals are discarded at the entry to at least one of the experience layers in the elitist pool, if their fitness estimate at that time is less than some function f( ) that depends at least on $\text{FitMin}(L_T)$. Note that the function f( ) need not necessarily be the same for all the layers at which the rule is applied.

Individuals that enter the top layer may themselves undergo further testing on samples in the training database.

With such further experience, the fitness estimate of even those individuals may change. This can introduce a wave effect in the top layer due to fluctuations in fitness estimates of the individual with minimum fitness. This will, in turn, affect the elitist pool minimum fitness if the top layer is at quota. If the fitness estimate of the individual with the minimum fitness in the top layer decreases, then the minimum fitness of the top layer (and hence the entire elitist pool minimum fitness) will decrease. In order to prevent this, in one embodiment, individuals that have reached the top layer do not undergo further testing. The justification here is that individuals in the top layer are assumed to already have fitness estimates which are as representative as possible to their actual fitness. Such an embodiment accepts any remaining error in the fitness estimate because the likelihood that purely random variations at that point would exceed an error range already considered acceptable, is too large.

In one embodiment, individuals are harvested from the entire elitist pool for use against production data. In another embodiment, only individuals that have reached the top layer are subject to harvesting. In either embodiment, further selection criteria can be applied in the harvesting process. Such criteria is usually specific to the application environment, and can include, for example, both fitness as well as characteristics of each individual's fitness trial history.

Example Embodiment

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate gene pool. As used herein, the term "database" does not necessarily imply any unity of structure. For example, two or more separate databases, when considered together, still constitute a "database" as that term is used herein. The candidate gene pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. In a financial asset trading environment, an individual might provide trading signals (e.g. buy, sell, hold current position, exit current position), and fitness may be measured by the individual's ability to make a profit, or the ability to do so while maintaining stability, or some other desired property. In the healthcare domain, an individual might propose a diagnosis based on patient prior treatment and current vital signs, and fitness may be measured by the accuracy of that diagnosis as represented in the training data.

The production system 112 operates according to a production gene population in another database 122. The production system 112 applies these individuals to production data 124, and produces outputs 126, which may be action signals or recommendations. In the financial asset trading environment, for example, the production data 124 may be a stream of real time stock prices and the outputs 126 of the production system 112 may be the trading signals or instructions that one or more of the individuals in production gene population 122 outputs in response to the production data 124. In the healthcare domain, the production data 124 may be current patient data, and the outputs 126 of the production system 112 may be a suggested diagnosis or treatment regimen that one or more of the individuals in production gene population 122 outputs in response to the production data 124. The production gene population 122 is harvested from the training system 110 once or at intervals, depending on the embodiment. Preferably, only individuals from elitist pool 118 are permitted to be harvested. In an embodiment, further selection criteria is applied in the harvesting process. Such further selection criteria may for example involve reference to the fitness trial histories of the individuals in the pool.

The controlled system 128 is a system that is controlled automatically by the signals 126 from the production system. In the financial asset trading environment, for example, the controlled system may be a fully automated brokerage system which receives the trading signals via a computer network (not shown) and takes the indicated action. Depending on the application environment, the controlled system 128 may also include mechanical systems such as a engines, air-conditioners, refrigerators, electric motors, robots, milling equipment, construction equipment, or a manufacturing plant.

Figure 2:
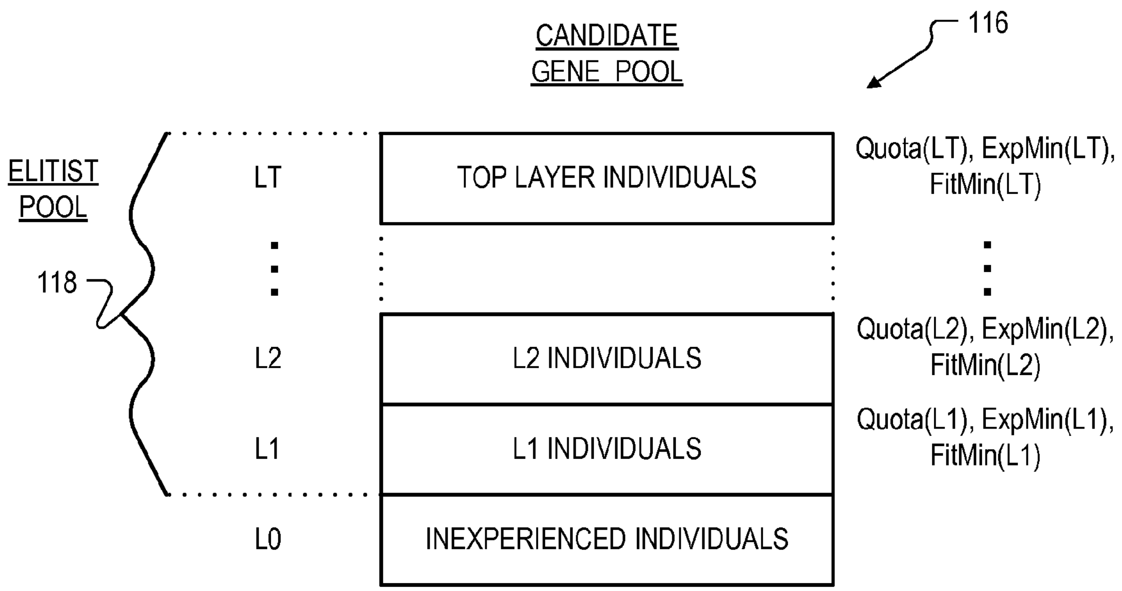
FIG. 2 is a symbolic drawing of the candidate gene pool in FIG. 1.

FIG. 2 is a symbolic drawing of the candidate gene pool 116 in FIG. 1. An "experience layered" elitist pool is used in the present embodiment, though aspects of the invention can be used in embodiments without experience layers, and indeed without an elitist pool. As can be seen in FIG. 2, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The layers $L_1$ through $L_T$ constitute the elitist pool 118 (FIG. 1). Each layer i in the elitist pool 118 has associated therewith three "layer parameters": a quota Quota$(L_i)$ for the layer, a range of experience levels [ExpMin$(L_i)$ . . . ExpMax$(L_i)$] for the layer, and the minimum fitness FitMin$(L_i)$ for the layer. For example, an embodiment in the financial asset trading environment may have on the order of 40 or 50 layers in the elitist pool, each containing individuals with experience levels within a range on the order of 4000-5000 trials. The minimum experience level ExpMin$(L_1)$ may be on the order of 8000-10,000 trials, and each layer may have a quota on the order of 100 individuals.

In the embodiment of FIG. 2, the quotas for all the layers in the elitist pool 118 are equal and fixed. Neither is required in another embodiment. In addition, ExpMin$(L_0)$=0 in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layer in candidate gene pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate gene pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate gene pool 116 using the SQL "insert" statement, and individuals being discarded can be deleted using the SQL "delete" statement. In another embodiment, the individuals in candidate gene pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list.

FIG. 3 is a symbolic drawing of an individual 310 in either the candidate gene pool 116 or the production gene population 122. As used herein, an "individual" is defined by its contents. An individual created by procreation is considered herein to constitute a different individual than its parents, even though it retains some if its parents' genetic material. In this embodiment, the individual identifies an ID 312, its experience level 314, its current fitness estimate 316, and its fitness trial history 324. It also includes one or more "rules" 318, each of which contains one or more conditions 320 and an output 322 to be asserted if all the conditions in a given sample are true. During procreation, any of the conditions or any of the outputs may be altered, or even entire rules may be replaced. The individual's experience level 314 increments by one for each sample of the training data 114 on which it is tested, and its overall fitness estimate 316 is determined by fitness function 120, averaged (or otherwise combined) over the all the trials.

As used herein, a "result" is the combination of outputs produced by an individual in response to a single data sample (either during training or in production), and the "performance" of an individual is a measure of how good the "result" was on that single sample. "Experience" level is a count of the number of samples on which the individual has been tested, though in systems that discard duplicate tests as described herein, it is a count of the number of unique samples on which the individual has been tested. An individual's "average performance" is the average of the "performance" of the individual over all the samples counted in the individual's experience level, and it can be used directly as the overall fitness estimate of the individual in some embodiments. In other embodiments the overall fitness estimate can be weighted to favor or disfavor some characteristic, such as a characteristic of the individual's fitness trial history as described herein.

A rule is a conjunctive list of indicator-based conditions in association with an output. Indicators are the system inputs that can be fed to a condition. These indicators are represented in the training database 114, as well as in the production data 124. Indicators can also be introspective, for example by indicating the fitness estimate of the individual at any given moment. In the embodiment of FIG. 1, the individual's conditions are all specified as parameter/value ("P/V") pairs. That is, if in the current sample, the specified parameter has the specified value (or range of values), then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In a financial asset trading embodiment, during training, an individual can be thought of as a virtual trader that is given a hypothetical sum of money to trade using historical data. Such trades are performed in accordance with a set of rules that define the individual thereby prompting it to buy, sell, hold its position, or exit its position. The outputs of the rules are trading action signals or instructions, such as buy, sell, exit or hold. Rules may also be designed to contain gain-goal and stop-loss targets, thus rendering the exit action redundant. A hold occurs when no rule in the individual is triggered, therefore, the individual effectively holds its current position. The indicators on which the rules are based can be, for example, a time increment ("tick"), or the closing price for a stock day.

The following code defines an example rule in terms of conditions and indicators, as well as the action asserted by the rule, in accordance with one embodiment of the present invention:

```
if (PositionProfit >= 2% and !(tick= (−54/10000)% prev tick and
MACD is negative)
and !(tick= (−119/10000)% prev tick and Position is long ))
and !(ADX × 100 <= 5052))
then SELL
```

where "and" represents logical "AND" operation, "!" represents logical "NOT" operation, "tick", "MACD" and "ADX" are stock indicators, "SELL" represents action to sell, and "PositionProfit" represents the profit position of the individual.

In a healthcare embodiment, an individual can be thought of as a set of rules predicting a patient's future state, given the patient's current and past state. The outputs of the rules can be proposed diagnoses or proposed treatment regimens that the individual asserts are appropriate given the conditions of the individual's rules. The indicators on which the rules are based can be a patient's vital signs, and past treatment and medication history, for example. An example rule is as follows:

```
if pulse>=120 and 18<=blood pressure[6]<20 and temp >= 104 and
surgery duration < 22 and clamp on artery and medication = EB45 and
```

-continued

```
last medication >= 60 and !white blood cell count [3] < −2.3
and !oxygen level [1] < −1.1 -->>>
then thromboembolism @ prob <= 0.65
```

The training data is arranged in the database 114 as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's output matches the result of the sample. In another embodiment, such as in the financial asset trading embodiment, the result may be only implicit. For example, the sample may include the price of an asset at each tick throughout a trading day, and the training system 110 must hypothetically perform all the trading recommendations made by the individual throughout the trading day in order to determine whether and to what extent the individual made a profit or loss. The fitness function can be dependent upon the profit or loss that the individual, as a hypothetical trader, would have made using the tick data for the sample.

FIG. 4 is a symbolic drawing indicating how the training data is organized in the database 114. The illustration in FIG. 4 is for the financial asset trading embodiment, and it will be understood how it can be modified for use in other environments. Referring to FIG. 4, three samples 410 are shown. Each sample includes a historical date, an identification of a particular security or other financial asset (such as a particular stock symbol), and raw historical market data for that financial asset on that entire trading day, e.g. tick data, trading volume data, price, etc.; and all other data needed to test performance of the individual's trading recommendations on this asset on this historical trading day.

Figure 5:
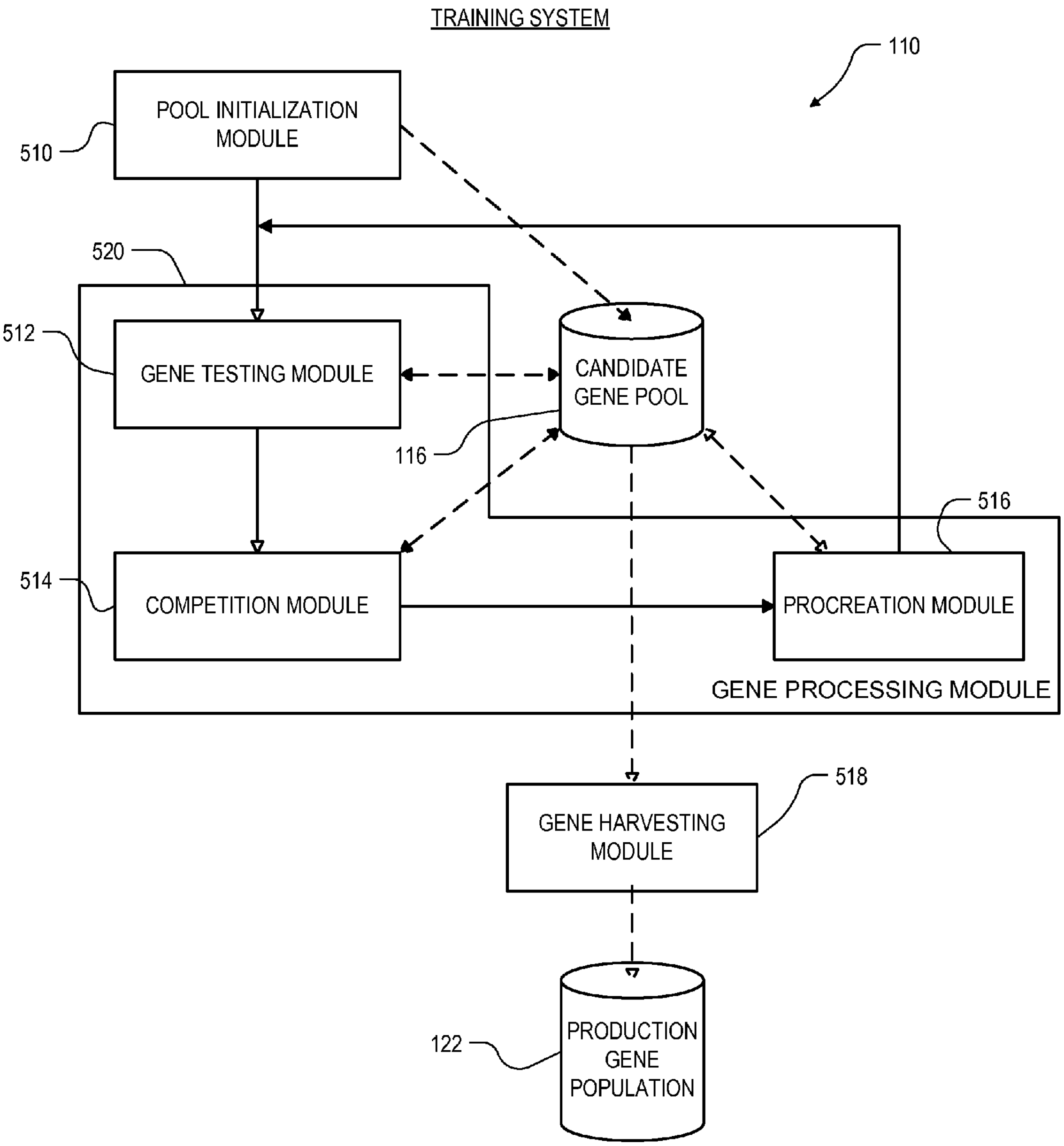
FIG. 5 illustrates modules that can be used to implement the functionality of the training system in FIG. 1.

FIG. 5 illustrates various modules that can be used to implement the functionality of training system 110 (FIG. 1). Candidate gene pool 116 and production gene population database 122 are also shown in the drawing. Solid lines indicate process flow, and broken lines indicate data flow. The modules can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "sub-modules", which themselves can be considered herein to constitute modules. In particular, the gene testing module 512, competition module 514, and procreation module 516 are also considered herein to be sub-modules of a gene pool processor module 520. The blocks in FIG. 5 designated as modules can also be thought of as flowchart steps in a method.

Referring to FIG. 5, the candidate gene pool 116 is initialized by pool initialization module 510, which creates an initial set of candidate individuals in $L_0$ of the gene pool 116. These individuals can be created randomly, or in some embodiments a priori knowledge is used to seed the first generation. In another embodiment, individuals from prior runs can be borrowed to seed a new run. At the start, all individuals are initialized with an experience level of zero and a fitness estimate that is undefined.

Gene testing module 512 then proceeds to test the population in the gene pool 116 on the training data 114. Only a subset of the population in the gene pool 116 is tested at this point. As used herein, the term "subset", unless otherwise qualified, includes both proper and improper subsets as well as the null set. However, for the reasons explained above, the subset which is tested at this point is a non-null subset which includes only those individuals that have not yet reached the top layer $L_T$ of the elitist pool 118 (of which there are none initially). Each individual in the subset undergoes a battery of tests or trials on the training data 114, each trial testing the individual on one sample 410. In one embodiment, each battery might consist of only a single trial. Preferably, however, a battery of tests is much larger, for example on the order of 1000 trials. In one embodiment, at least the initial battery of tests includes at least ExpMin($L_1$) trials for each individual, to enable the initial individuals to qualify for consideration for the first layer of the elitist pool 118. Note there is no requirement that all individuals undergo the same number of trials.

After each trial of a particular individual on a particular data sample, the performance of the trial is recorded in the fitness trial history 324 for the particular individual. FIG. 3A illustrates an example implementation of a fitness trial history 324. As can be seen, fitness trial history 324 can be implemented as simply a table having an identifier of the particular data sample tested in the first column, and the individual's performance on that data sample in the second column. Other embodiments can included additional columns if it is desired to record other measures of performance.

The sample IDs can be simply numeric identifiers assigned to each data sample. This can be the case whether the data samples in the training data are ordered or unordered. If the data samples are ordered, then whatever index defines the ordering, assuming it is unique, can also be used as the sample ID. For time-ordered data samples, for example, the date or time that is associated with each sample can conveniently double as the sample ID. Thus in an embodiment in which each of the data samples contains tick data for a single security on a single date, the date associated with the sample can double as the sample ID. Alternatively, a conflation of the date and the security symbol can be used as the sample ID.

After the tests, gene testing module 512 updates the fitness estimate associated with each of the individuals tested. In an embodiment, the fitness estimate may be an average of the results of all trials of the individual. In this case the "fitness estimate" can conveniently be indicated by two numbers: the sum of the performance measures of all trials of the individual, and the total number of trials that the individual has experienced. The latter number may already be maintained as the experience level of the individual. The fitness estimate at any particular time can then be calculated as follows:

$$\text{fitness estimate} = \frac{\sum_{i=1}^{n} \text{performance } measure_i}{n},$$

where performance measure, is the individual's performance measure when tested on data sample i, and n is the number of data samples on which the individual has been tested, given by the individual's experience level. In an embodiment such as this, "updating" of the fitness estimate can involve merely adding the performance measures from the most recent trials to the prior sum.

In another embodiment, however, the fitness estimate is weighted according to a favored or disfavored characteristic that depends on the fitness trial history. For example, in one application, individuals may be favored or disfavored based on their consistency of performance over their entire history. Consistency can be measured by statistical means, such as by standard deviation, variance, or maximum deviation of the individual's performance on individual data samples. For example:

$$\text{fitness estimate} = \frac{\sum_{i=1}^{n} \text{performance } measure_i}{n(1+\sigma)},$$

where performance measure, and n are as above, and σ is the standard deviation of the performance measures over all n trials.

In another embodiment, the fitness estimate is capped at a certain level. In other words, for positive values of non-weightedFitness:

fitness estimate=Min(CAP_VALUE,non-weightedFitness).

This technique, which applies a form of weighting which is piecewise rather than smooth, has the effect of reducing the system's sensitivity to very large outlier values.

In applications where data samples are ordered, such as time-ordered data, the fitness estimate can be weighted to favor or disfavor individuals that took fewer risks over time, showed less volatility, or experienced fewer or shorter or shallower periods of weak or negative performance over time. The reader will be aware of various formulas for deriving numerical measures for these characteristics, and can then use such measures to weight the fitness estimate calculations. It will be appreciated that for characteristics that depend on trends of an individual's performance over time or over some other ordered data sequence, it may be desirable to ensure that the sample data on which the individual is trained is spread fairly uniformly through the period or range. It may also be desirable to ensure that such sample data covers an overall time period or range which is large enough to include as many varied types of situations as possible that might also occur in the production data. Some of these characteristics can be evaluated using the Lake ratio, which is a way to calculate risk/volatility, by measuring the rate at which a time series spends dipping and recovering (e.g., draw-downs and corresponding recoveries in an equity curve). See http://www.seykota.com/tribe/risk/index.htm, incorporated by reference herein. The Lake ratio can be included in the fitness estimate by calculating the fitness estimate after testing on n samples according to the following formula:

$$\text{fitness estimate} = \frac{\sum_{i=1}^{n} \text{performance } measure_i}{\text{Lake Ratio}}$$

where Lake Ratio=WATER/EARTH;

WATER=SUM(P(j)−E(j)) for j=1 to n samples;

EARTH=SUM(E(k)) for k=1 to n samples;

E(i)=performance measure,

P(i): the highest "peak" looking backward after i samples, defined as P(i)=MAX(E(m)) for m=1 to m=i;

and n is the number of data samples on which the individual has been tested.

Many other historical characteristics will be apparent to the reader, and can be accounted for in the fitness estimate once the fitness trial history of an individual has been maintained. Though in one embodiment the fitness estimate 316 can be calculated and updated after every trial experienced by a particular individual, preferably it is updated only when the individual's fitness is about to be compared with those of other individuals. Typically this will be at the end of each battery of trials.

In addition, it will be appreciated that for individuals that have not yet been tested on large numbers of data samples, the size of the gaps between samples means that measures of historical trend characteristics may not be very reliable. In an embodiment, therefore, an individual's fitness estimate is not weighted in accordance with its fitness training history until the individual's experience level has reached a predetermined threshold. Preferably this threshold matches the minimum experience level of one of the experience layers in the elitist pool 118, because this will ensure that unweighted fitness estimates are compared only with unweighted fitness estimates, and weighted fitness estimates are compared only with weighted fitness estimates. It will be further appreciated that an embodiment can apply additional weighting only after the individual reaches a second, higher, threshold, which again preferably matches the minimum experience level of a higher one of the experience layers in the elitist pool 118, and so on. It will also be appreciated that an embodiment can calculate more than one fitness estimate, each favoring or disfavoring a different characteristic of the individual's fitness training history, and these can be used separately in the competition among the individuals. In such an embodiment the different fitness estimates can have the same or different experience level thresholds before the respective weightings are applied. Other variations will be apparent.

After the gene testing module 512 has updated the fitness estimate associated with each of the individuals tested, competition module 514 updates the candidate pool 116 contents in dependence upon the updated fitness estimates. The operation of module 514 is described in more detail below, but briefly, the module considers individuals from lower layers for promotion into higher layers, discards individuals that do not meet the minimum individual fitness of their target layer, and discards individuals that have been replaced in a layer by new entrants into that layer. Candidate gene pool 116 is updated with the revised contents.

Note that other considerations can also be applied beneficially to discard certain individuals at this stage. For example, if two individuals have similar overall fitness estimates and similar trial-by-trial performance, it may not be useful to retain both of them. Diversity in the candidate gene pool can be improved by discarding one of such individuals, which can be performed in competition module 514. The similarity of trial-by-trial performance histories can be evaluated by comparing the fitness trial histories of the two individuals. Note that in various embodiments, a comparison of the fitness trial histories among two individuals may not be valid unless a determination is made that the collections of data samples on which the two individuals have been tested overlap to a sufficient degree. This determination, too, can be made by reference to the fitness trial histories.

After the candidate gene pool 116 has been updated, a procreation module 516 evolves a random subset of them. Only individuals in the elitist pool are permitted to procreate. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with an experience level of zero and with a fitness estimate that is undefined. These individuals are placed in $L_0$ of the gene pool 116. Preferably, after new individuals are created by combination and/or mutation, the parent individuals are retained. In this case the parent individuals also retain their experience level and fitness estimates, and remain in their then-current elitist pool layers. In another embodiment, the parent individuals are discarded.

After procreation, gene testing module 512 operates again on the updated gene pool 116. The process continues repeatedly.

Sometime after the top layer of elitist pool 118 is full, individuals can be harvested for use by production system 112. Gene harvesting module 518 retrieves individuals for that purpose. In one embodiment, gene harvesting module 518 retrieves individuals periodically, whereas in another embodiment it retrieves individuals only in response to user input. Gene harvesting module 518 selects only from the top layer $L_T$, and can apply further selection criteria as well in order to choose desirable individuals. For example, it can select only the fittest individuals from $L_T$, and/or only those individuals that have shown low volatility. Other criteria will be apparent to the reader. The individuals also undergo further validation as part of this further selection criteria, by testing on historical data not part of training data 114. The individuals selected by the gene harvesting module 518 are written to the production gene population database 122 for use by production system 112 as previously described.

In an embodiment, gene harvesting module 518 uses selection criteria which depend on the fitness trial history of the individuals in the top layer $L_T$. This feature, which can be used whether or not fitness trial history is used to weight fitness estimates for purposes of gene competition, can select for any of the characteristics mentioned above, or others. Thus in one embodiment, only those individuals in the top layer $L_T$ which have performed consistently at roughly the same level throughout their training, or which have exhibited low volatility over time-sequenced sample data, or have exhibited a beneficial Lake ratio, or took fewer risks over time, or experienced fewer or shorter or shallower periods of weak or negative performance over time, or meet any other criteria measurable based on the fitness trial history, can be used to select individuals for harvesting. The selection process may be binary, in which case all those individuals that fail to meet a predefined threshold for the criterion's measurement are precluded from harvesting, or it may be comparison-based, in which case only the top N individuals in the top layer $L_T$, as ranked by the criterion's measurement, will be harvested, or it may be a combination of both.

In an embodiment, the selection criteria employed by gene harvesting module 518 also can compare a particular characteristic of one individual's fitness trial history with that of a different individual. Thus, for example, as described above with respect to the competition module 514, diversity in the candidate gene pool can be improved by discarding one of two individuals that have similar overall fitness estimates and also similar trial-by-trial fitness histories. Again, in various embodiments, validity of a comparison of the fitness trial histories among two individuals may not be valid unless the collections of data samples on which the two individuals have been tested overlap to a sufficient degree, a determination which also can be made by reference to the fitness trial histories.

As mentioned, competition module 514 manages the graduation of individuals from lower layers in the candidate gene pool 116, up to higher layers. This process can be thought of as occurring one individual at a time, as follows. First, a loop is begun through all individuals whose experience level has changed since the last time competition module 514 was executed. If the current individual's experience level has not increased sufficiently to qualify it for the next experience layer in the elitist pool 118, then the individual is ignored and the next one is considered. If the current individual's experience level has increased sufficiently to qualify it for a new experience layer, then the module 514 determines whether the target experience layer is already at quota. If not, then the individual is simply moved into that experience level. If the target layer is full, then the competition module 514 determines whether the fitness estimate of the current individual exceeds that of the least fit individual in the target layer. If so, then the least fit individual is discarded, and the current individual is moved up into the target layer. If not, then the current individual is discarded. The process then moves on to consider the next individual in sequence. Note that while individuals typically move up by only one experience layer at a time, that is not requirement in all embodiments. In some embodiments, such as in a client/server embodiment, it may happen that a particular individual is not considered for advancement within the elitist pool 118 until after its experience level has increased sufficiently for it to jump past one or more experienced layers.

In an embodiment that enforces an elitist pool minimum fitness, the step in which the fitness estimate of the current individual is compared to the minimum fitness of the target layer, can further include a test of whether the current individual's fitness estimate satisfies the elitist pool minimum fitness. Typically this latter test is applied only on individuals graduating out of level 0, but as mentioned previously, could be applied to individuals being considered for other layers in the elitist pool 118 as well. If the current individual does not satisfy the elitist pool minimum fitness, then it is discarded.

The above routine processes individuals sequentially, and different embodiments can implement different sequences for processing the individuals. Note that the processing sequence can affect the results if, for example, an individual in layer L is being considered for layer $L_{i+1}$ at the same time that an individual in layer $L_{i-1}$ is being considered for layer L. If the former test occurs first, then a hole will be opened in layer $L_i$ and the individual graduating from layer $L_{i-1}$ will be promoted into layer $L_i$ automatically. If the latter test occurs first, then the individual graduating from layer $L_{i-1}$ will have to compete for its place in layer L (assuming layer $L_i$ is at quota). In another embodiment, individuals are considered layer by layer either according to their target layer after promotion, or according to their current layer prior to promotion. Again, the sequence of individuals to consider within each layer will depend on the embodiment, as will the sequence in which the layers themselves are considered.

Figure 6:
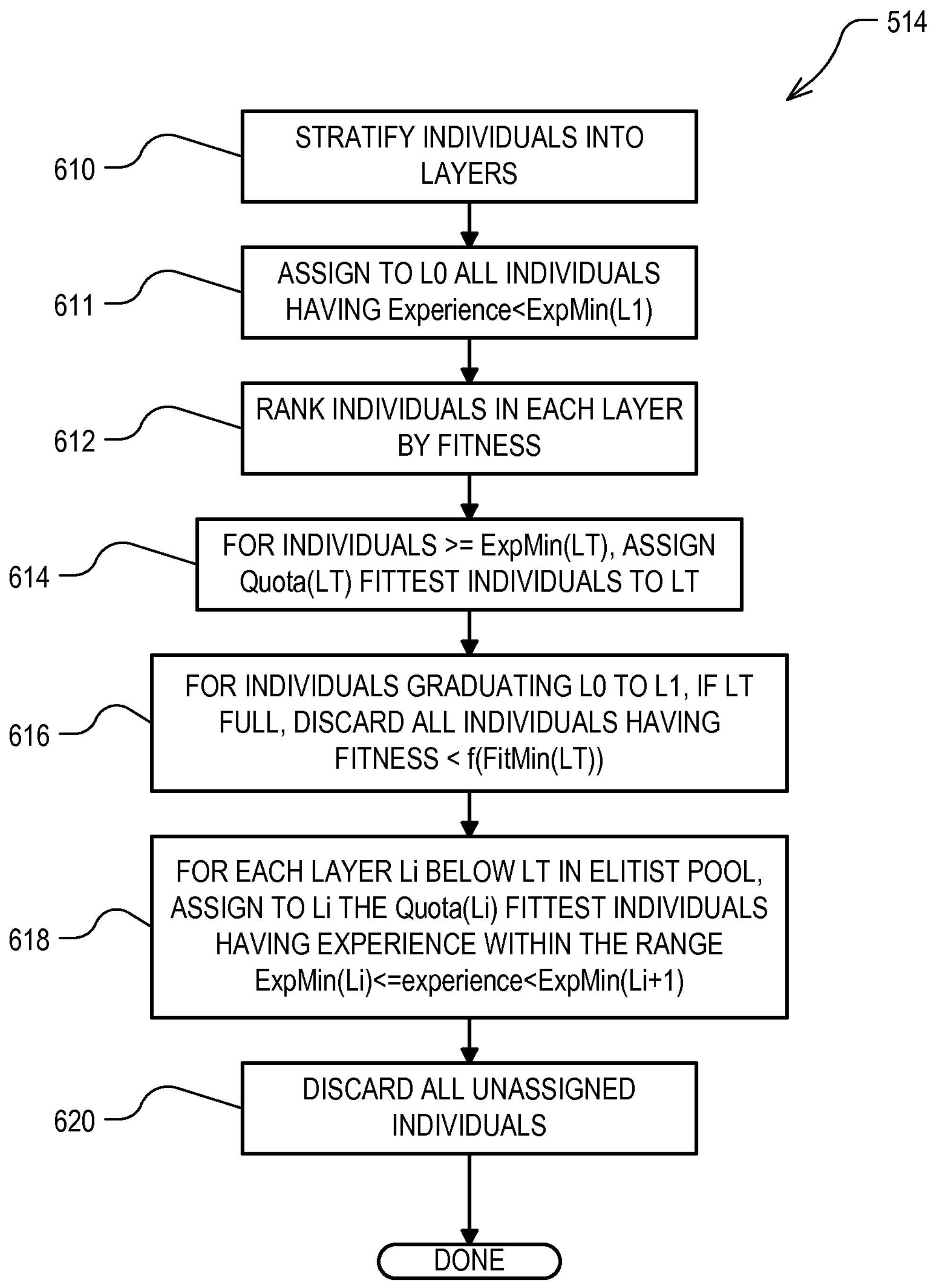
FIG. 6 illustrates a method of operation of the competition module in FIG. 5.

FIG. 6 illustrates a bulk-oriented method of operation of competition module 514. In the embodiment of FIG. 6, the layers in the candidate gene pool 116 are disbanded and reconstituted each time the competition module 514 executes. These executions of competition module 514 are sometimes referred to herein as competition "events", and each comparison made between the fitness estimate of one individual and that of another is sometimes referred to herein as a comparison "instance".

In step 610, all the individuals in candidate gene pool 116 are stratified into their experience layers. In step 611, all individuals whose experience level is still within that of $L_0$, are assigned automatically to $L_0$. In step 612, within each experience layer $L_1$-$L_T$, the individuals are ranked according to their fitness estimates. In embodiments in which fitness trial history is taken into account in the calculation of an individual's fitness estimate, the ranking in step 612 will be affected by that calculation. In step 614, of those individuals whose experience level is at least equal to the minimum experience level of the top layer of the elitist pool 118, the Quota($L_T$) fittest are assigned to $L_T$. Note that this step could exclude some individuals with top layer experience, as individuals coming up from layer $L_{T-1}$ can supplant less fit individuals that were previously in $L_T$.

Step 616 implements the policy that once $L_T$ is full, no individuals are allowed into the elitist pool 118 unless they are at least as fit as some predetermined function f( ) of the top layer minimum fitness. In step 616, therefore, if $L_T$ is full, all individuals graduating from $L_0$ to $L_1$ whose fitness estimate is less than f(FitMin($L_T$)) are discarded. Variations of step 616 to implement variations of the elitist pool minimum fitness policy, will be apparent. In step 618, for each layer $L_i$ below the top layer $L_T$, all the individuals in the elitist gene pool 118 having experience level within the range associated with layer $L_i$ are considered. Of these individuals, only the Quota ($L_i$) fittest individuals are assigned to layer $L_i$. In step 620, all individuals remaining in elitist gene pool 118 which were not assigned to specific layers in steps 611, 614 or 618, are discarded.

As used herein, a phrase such as "only the five fittest individuals", need not necessarily fill all five places. That is, if there are only three individuals to consider, the phrase is satisfied if all three individuals are assigned places. Thus it can be seen that step 618 includes both a policy that individuals entering a layer that is already at quota must compete for their place in that layer, as well as a policy that individuals entering a layer that is not yet full are promoted to that layer automatically. It can also be seen that steps 618 and 620 together implement a policy that fitness comparisons are made only among individuals having roughly the same experience.

Figure 7:
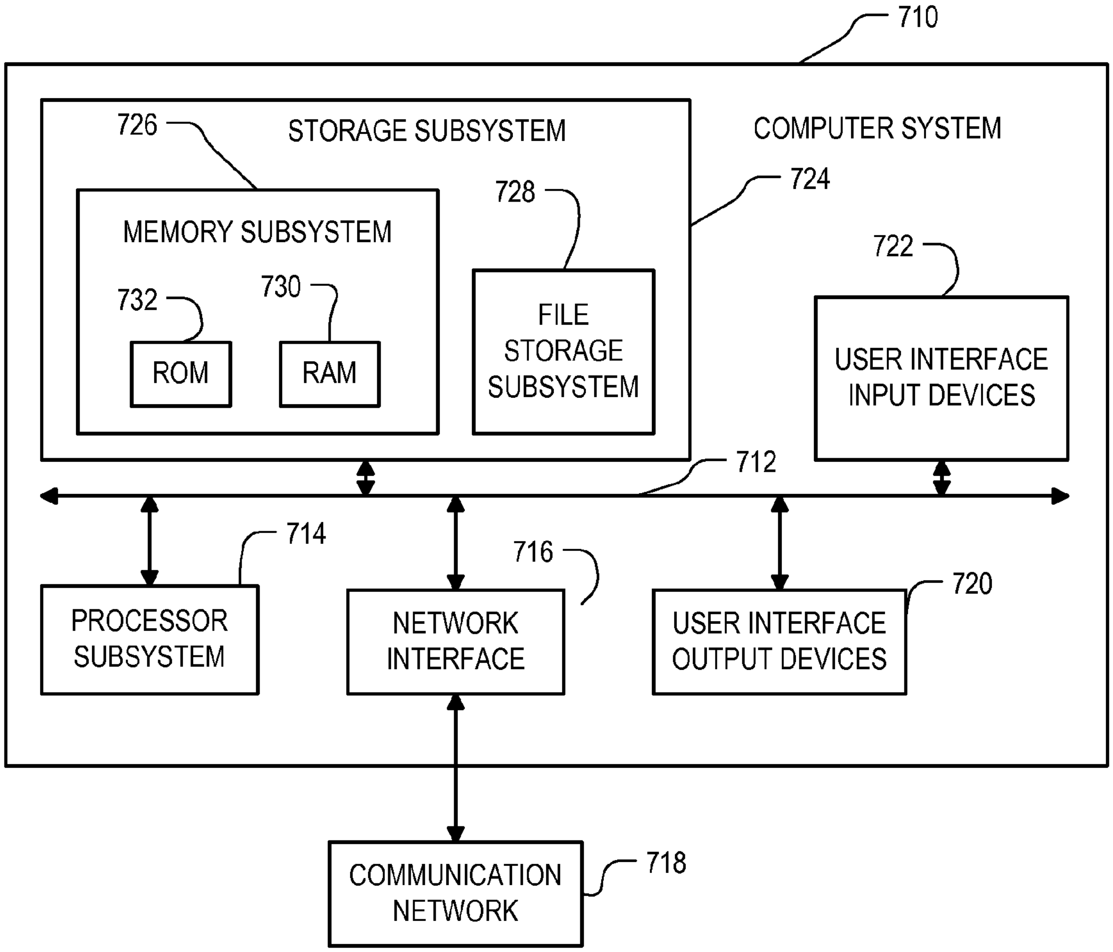
FIG. 7 is a simplified block diagram of a computer system that can be used to implement either or both of the training system or production system in FIG. 1, and/or the training server and clients in FIG. 8.

FIG. 7 is a simplified block diagram of a computer system 710 that can be used to implement training system 110, production system 126, or both. While FIGS. 1, 5, 6 and 9 indicate individual components for carrying out specified operations, it will be appreciated that each component actually causes a computer system such as 710 to operate in the specified manner.

Computer system 710 typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks, including an interface to communication network 718, and is coupled via communication network 718 to corresponding interface devices in other computer systems. Communication network 718 may comprise many interconnected computer systems and communication links. These communication links may be wireline links, optical links, wireless links, or any other mechanisms for communication of information. While in one embodiment, communication network 718 is the Internet, in other embodiments, communication network 718 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710 or onto computer network 718.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system. In particular, an output device of the computer system 710 on which production system 112 is implemented, may include a visual output informing a user of action recommendations made by the system, or may include a communication device for communicating action signals directly to the controlled system 128. Additionally or alternatively, the communication network 718 may communicate action signals to the controlled system 128. In the financial asset trading environment, for example, the communication network 718 transmits trading signals to a computer system in a brokerage house which attempts to execute the indicated trades.

Storage subsystem 724 stores the basic programming and data constructs that provide the functionality of certain embodiments of the present invention. For example, the various modules implementing the functionality of certain embodiments of the invention may be stored in storage subsystem 724. These software modules are generally executed by processor subsystem 714. Storage subsystem 724 also stores the candidate gene pool 116, the training database 114, and/or the production gene population 122. Alternatively, one or more of such databases can be physically located elsewhere, and made accessible to the computer system 710 via the communication network 718.

Memory subsystem 726 typically includes a number of memories including a main random access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 728. The host memory 726 contains, among other things, computer instructions which, when executed by the processor subsystem 714, cause the computer system to operate or perform functions as described herein. As used herein, processes and software that are said to run in or on "the host" or "the computer", execute on the processor subsystem 714 in response to computer instructions and data in the host memory subsystem 726 including any other local or remote storage for such instructions and data.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 710 depicted in FIG. 7 is intended only as a specific example for purposes of illustrating the preferred embodiments of the present invention. Many other configurations of computer system 710 are possible having more or less components than the computer system depicted in FIG. 7.

Client/Server Embodiment

In some environments, the training data used to evaluate an individual's fitness can be voluminous. Therefore, even with modern high processing power and large memory capacity computers, achieving quality results within a reasonable time is often not feasible on a single machine. A large gene pool also requires a large memory and high processing power. In one embodiment, therefore, a client/server model is used to provide scaling in order to achieve high quality evaluation results within a reasonable time period. Scaling is carried out in two dimensions, namely in pool size as well as in evaluation of the same individual to generate a more diverse gene pool so as to increase the probability of finding fitter individuals. In the client/server embodiment, the gene pool is distributed over a multitude of clients for evaluation. Each client continues to evaluate its own client-centric gene pool using data from training database 114, which it may receive in bulk or periodically on a sustained and continuing basis. Individuals that satisfy one or more predefined conditions on a client computer are transmitted to the server to form part of a server-centric gene pool.

Distributed processing of individuals also may be used to increase the speed of evaluation of a given individual. To achieve this, individuals that are received by the server but have not yet been tested on a certain number of samples, or have not yet met one or more predefined conditions, may be sent back from the server to a multitude of clients for further evaluation. The evaluation result achieved by the clients (alternatively called herein a partial evaluation) for an individual is transferred back to the server. The server merges the partial evaluation results of an individual with that individual's fitness estimate at the time it was sent to the clients to arrive at an updated fitness estimate for that individual in the server-centric gene pool. For example, assume that an individual has been tested on 500 samples and is sent from the server to, for example, two clients each instructed to test the individual on 100 additional samples. Accordingly, each client further tests the individual on the additional 100 samples and reports its own client-centric fitness estimate to the server. The server combines these two estimates with the individual's fitness estimate at the time it was sent to the two clients to calculate an updated server-centric fitness estimate for the individual. The combined results represent the individual's fitness evaluated over 700 days. In other words, the distributed system, in accordance with this example, increases the experience level of an individual from 500 samples to 700 samples using only 100 different training samples at each client. A distributed system, in accordance with the present invention, is thus highly scalable in evaluating its individuals.

Advantageously, clients are enabled to perform individual procreation locally, thereby improving the quality of their individuals. Each client is a self-contained evolution device, not only evaluating the individuals in its own pool, but also creating a new generation of individuals and moving the evolutionary process forward locally. Thus clients maintain their own client-centric gene pool which need not match each other's or the server-centric gene pool. Since the clients continue to advance with their own local evolutionary process, their processing power is not wasted even if they are not in constant communication with the server. Once communication is reestablished with the server, clients can send in their fittest individuals to the server and receive additional individuals from the server for further testing.

Two problems have been discovered in client/server embodiments which can be addressed through the maintenance of fitness trial histories. These problems, which can also arise in single-server embodiments, are highlighted in client/server embodiments which lack centralized control of the training data sample sets on which each individual is being tested at the client computer systems. Firstly, it can be appreciated that once a particular individual has been tested on a particular data sample, it would waste resources to re-test that individual on the same data sample. Thus in embodiments herein, the fitness trial history, which includes the identifiers of each data sample on which the individual has already been tested, is used to avoid such duplicate testing. Secondly, in embodiments where it is still possible for an individual to be tested on a single data sample twice, such as where two different clients have tested the same individual independently on unintentionally overlapping data sample test sets, a simple combining process which combines the overall fitness estimates from the various testing batteries can yield a combined fitness estimate which is not entirely accurate. In particular, it will unintentionally emphasize the performance of the individual on data samples that were tested more than once. To improve the validity of the combination, therefore, an intelligent merging process is used which compares the fitness trial history of each testing battery and deletes duplicate tests.

Figure 8:
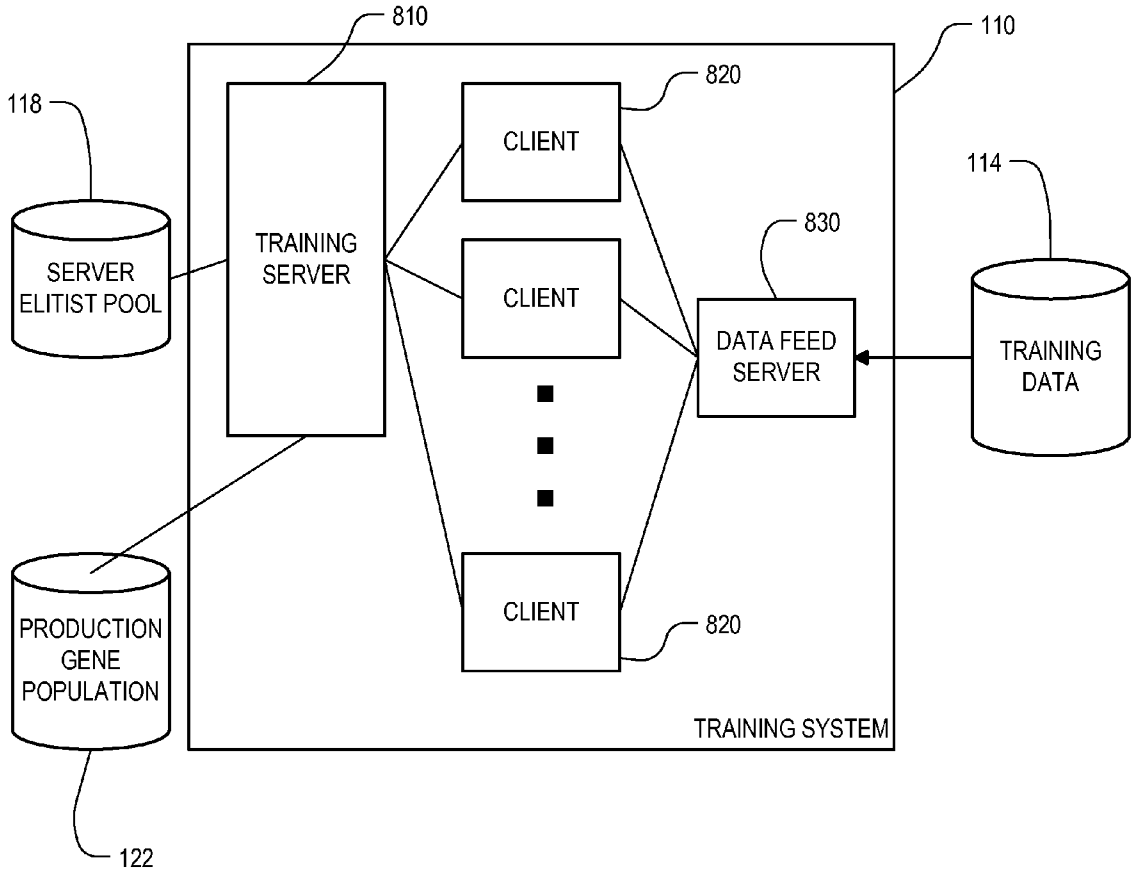
FIG. 8 is a high-level block diagram of an example embodiment of the training system of FIG. 1 using a network computing system.

FIG. 8 is a high-level block diagram of an example embodiment of training system 110 implemented using a network computing system. The training system 110 includes a plurality of client computers 820 (sometimes referred to herein simply as "clients") and a training server computer 810. Server 810 may itself be a central or a distributed server. A client computer 820 may be a laptop computer, a desktop computer, a cellular/VoIP handheld computer or smart phone, a tablet computer, distributed computer, or the like. An example system may have hundreds of thousands of clients. In an embodiment, the training server and/or each of the client computers can have the structure of FIG. 7, or any of its variations as described above. The client computers 820 communicate with the training sever 810 to receive individuals for testing, and to report tested individuals back to the training server 810. The training server 810 maintains a server-centric experience-layered elitist pool 118, but in an embodiment, does not maintain any candidate individuals below layer $L_1$ of the elitist pool. New individuals are created by clients, both during initialization and by procreation, and they are not reported to the training server 810 until they have been tested on sufficient numbers of samples to qualify for the server's elitist pool 118. The number of individuals created by the clients 820 may vary depending on the memory size and the CPU processing power of the client. For example, in one embodiment, a client may have 1000 individuals for evaluation. Each client computer 820 further has a communication port to access one or more data feed servers 830, which retrieve and forward training samples from the training database 114 to the client computers 820. Alternatively, although not shown, the training samples may be supplied from data feed server 830 to the clients 820 via the training server 810.

Figure 9:
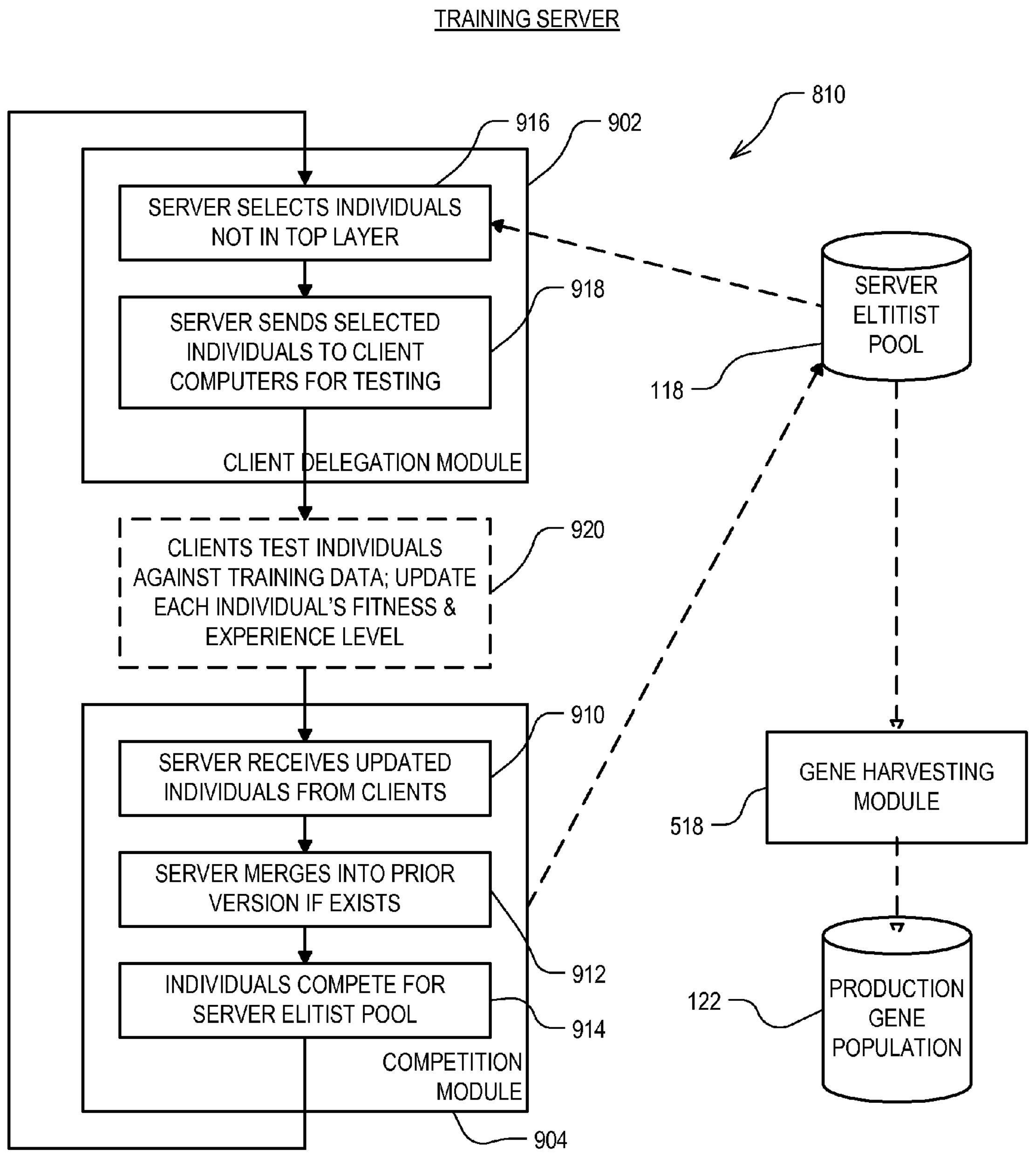
FIG. 9 illustrates modules that can be used to implement the functionality of training server of FIG. 8.

FIG. 9 illustrates various modules that can be used to implement the functionality of training server 810 (FIG. 8). Elitist pool 118 and production gene population database 122 are also shown in the drawing. As in the embodiment of FIG. 5, solid lines in FIG. 9 indicate process flow, and broken lines indicate data flow. The implementation variations mentioned above with respect to the embodiment of FIG. 5 apply to FIG. 9 as well.

In the operation of the client/server model, the training server 810 does not perform any testing or procreation itself. It does, however, enforce competition within its own server-centric elitist pool 118 when individuals are returned from clients. FIG. 9 illustrates various modules that can be used to implement the functionality of training server 810. Like the embodiment of FIG. 5, the training server 810 includes a competition module 904. It also includes gene harvesting module 518, which may be same as in FIG. 5. It also includes gene testing and procreation functionality, but these are combined into a single client delegation module 902 in FIG. 9. The client delegation module 902 and the competition module 904 constitute two sub-modules in a gene pool processor module (not shown specifically in FIG. 9). The FIG. 9 embodiment does not include a pool initialization module in the sense of FIG. 5, since as mentioned, the clients initialize their own individual pools.

Referring to FIG. 9, in step 910, the competition module 904 receives individuals from one or more of the client computers 820. These individuals may arrive asynchronously, if and when client computers have them available to transmit. They may arrive out-of-order, and some individuals previously sent out for testing may never return. Individuals may arrive individually, or in bunches. At various times determined by competition module 904, after at least one individual has arrived, competition module 904 proceeds to step 912 to begin a competition "event".

In step 912, competition module 904 determines whether each incoming individual is a new one, or a return of an individual that the server previously sent out for testing. This determination can be made on the basis of individual IDs 312 (FIG. 3). If the latter, then the training server 810 merges the newly received copy of the individual into the prior version in the server-centric elitist pool 118. In one embodiment, the merging step involves merely replacing the prior copy of the individual in the server-centric elitist pool 118, with the one newly received. In a variation of that embodiment, replacing may involve merely updating the experience level and the fitness estimation of the prior copy of the individual in the server-centric elitist pool 118. In another embodiment, the merging step can be more involved as described in more detail below with respect to FIG. 10.

In step 914 the incoming individual (if new) or the updated individual (if merged) competes for its position in the server elitist pool 118. The same rules of competition apply here as they do for the competition module 514 in the server-only model. That is, the fitness estimate of the incoming individual is compared to the least fit individual in the now-appropriate experience layer for the incoming individual, and only the fitter of the two is retained. The other is discarded. An elitist pool minimum fitness policy can be applied here as well, based on a server-centric minimum fitness level. Alternatively, the entire server elitist pool 118 can be disbanded and reconstituted at each competition event, as described in more detail with respect to FIG. 6. In either case, though not required in all embodiments, it is preferred that the fitness estimates compared in the competition step 914 take into account the fitness trial history of the individuals, as explained above with respect to FIG. 5.

In the client delegation module 902, in step 916, the server 810 selects individuals from the server-centric elitist pool 118, and sends them out to one or more clients 820 for further testing (step 918). As in the server-only embodiment, the client delegation module 902 is restricted from selecting for further testing individuals already in the top layer of the elitist pool 118. In one embodiment, the battery of trials that an individual is to undergo is dictated by the training server. In such an embodiment, the server-centric view of the battery is the same as the client-centric view of the battery. In another embodiment, the battery of trials that an individual is to undergo is left to the client to decide, and client may perform more than one battery of trials on the individual before returning it to the server. In the latter embodiment, the client has its own client-centric view of a testing battery. It will be appreciated that in either embodiment, there is potential for the various testing batteries seen by an individual to overlap (i.e. potential for more than one of the testing batteries to include a particular training data sample). This is especially likely where there is no central control of the content of the various testing batteries, and where an individual may be undergoing training at more than one client simultaneously. The selection of data samples for testing in each battery of trials is described in more detail below.

In step 920 the client machines 820 test the individuals against training data from the data feed server 830, and update each individual's fitness and experience level locally. Step 920 is shown in broken lines in FIG. 9 because it is performed by clients rather than training server 810. At various subsequent times, the server 810 again receives back updated individuals from the clients in step 910, and repeats the process of FIG. 9.

The operation of the client computers 820 is the same as that previously described with respect to FIGS. 5 and 6, with the exception that individuals are provided both by the pool initialization module 510, as well as from the training server 810. The candidate gene pool 116 in a client computer 820 is client-centric, and includes all candidate individuals being considered by the clients, including those that do not yet have sufficient experience to be considered for the elitist pool in the client computer. The candidate gene pool in the clients are layer-oriented as shown in FIG. 2, and for convenience, the layers in a client computer are sometimes designated herein with a top layer numbered CT rather than T, and with layers designated $CL_0$-$CL_{CT}$. None of the layer parameters in the client-centric gene pool, including the number of layers, need be the same as their corresponding parameters in other clients or in the server. Preferably the candidate gene pool 116 in the client computers 820 are implemented using linked lists, whereas the elitist pool 118 in the server 810 are implemented using a DBMS, both as previously described.

Unlike the single server embodiment, the gene testing module in the client computer 820 does not prevent further testing of individuals that have reached the top layer $CL_{CT}$ of the client-centric elitist pool 820. The gene harvesting module in a client computer 820 selects individuals only from the top layer $CL_{CT}$ of the client computer 820 for transmitting back to the server 810. Since the server 810 does not maintain any individuals that do not qualify for the server-centric elitist pool 118, the minimum experience level of the top layer $CL_{CT}$ in the client-centric elitist pool on each client computer 820 must be at least as high as the minimum experience level of the lowest layer $L_1$ of the elitist pool 118 of the training server 810. Preferably the minimum experience level of the top layer $CL_{CT}$ in the client-centric elitist pool on each client computer 820 is equal to the minimum experience level of the lowest layer $L_1$ of the elitist pool 118 of the training server 810.

Note that because of procreation on the client system 820, individuals may be sent up to the training server 810 which the training server 810 had never before seen. Such individuals are handled in step 914 (FIG. 9), by requiring them to compete for their position in the server-centric elitist pool 118 of the training server 810. Note further that because of competition in the client computer 820, some individuals that the training server 810 sent to the client computer 820 for further testing will never be returned to the training server 810. In this case the prior copy of the individual, retained by the training server 810, remains in place in the elitist pool 118 of the training server 810 unless and until it is displaced through competition in the training server 810 (step 914). Still further, note that an individual retained in the training server 810 after it has also been sent to a client 820 for further testing, may become displaced and deleted from the elitist pool 118 in the training server 810 through competition in the training server 810 (step 914). In this case, if the same individual is returned by the client computer 820, the training server 810 simply ignores it.

As mentioned above, if in step 912 the competition module 904 determines that a particular incoming individual is a return of an individual that the training server 810 had previously sent out for testing, then the training server 810 merges the newly received copy of the individual into the prior version in the server-centric elitist pool 118. In one embodiment, this step can simply involve adding the FIG. 10 is a flow chart illustrating a preferred way to perform the merging step which makes use of the availability of fitness testing histories.

Figure 10:
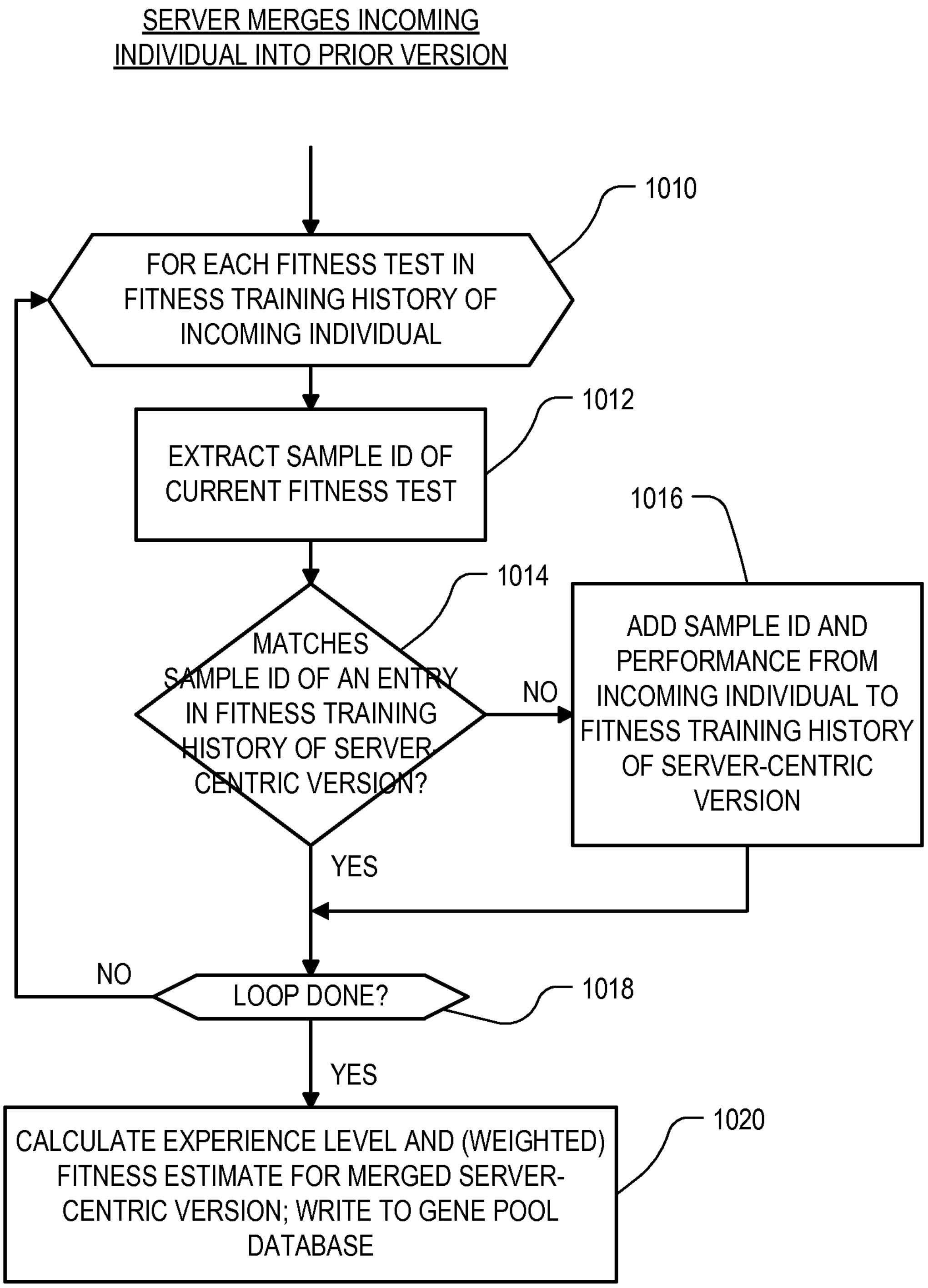
FIG. 10 is a flow chart illustrating steps performed when the training server of FIG. 8 merges an incoming individual which has undergone further training, into a pre-existing server-centric version of the same individual.

Referring to FIG. 10, in step 1010, the training server 810 begins a loop through all of the fitness tests in the fitness trial history of the incoming individual (see FIG. 3A). In step 1012, it extracts the sample ID of the current fitness test from the fitness trial history of the incoming individual. In step 1014 the system compares this sample ID with those already present in the fitness trial history of the server-centric version of the same individual. If there is a match, then the current fitness test is a duplicate. If the current fitness test were to be added to the server-centric fitness test history for the current individual, then any subsequent calculation of the overall fitness estimate for the individual improperly would overemphasize the individual's performance on this particular data sample. Therefore, the current fitness test is ignored. If there was no match in step 1014, then the current fitness test in the incoming individual is new to the server-centric individual, and in step 1016 the sample ID is added to the fitness trial history of the server-centric version of the individual in conjunction with the individual's performance on that data sample. The system then returns to step 1010 to consider the next fitness test in the fitness trial history of the incoming individual.

After all the fitness tests in the fitness trial history of the incoming individual have been merged into the fitness trial history of the server-centric version of the individual, the incoming individual can be discarded (thereby also discarding the duplicate test entries that were ignored after step 1014). As a result, the fitness trial history of the server-centric version of the individual now reflects the union of the sets of fitness trials from the prior server-centric fitness trial history and that of the incoming individual. This union excludes all duplicate entries.

In step 1020, the training server 810 re-calculates the experience level 314 for the server-centric version of the individual. This calculation can be simply a count of the number of entries now present in the fitness trial history of the server-centric version of the individual. The training server 810 also re-calculates the overall fitness estimate 316 for the server-centric version of the individual. This can involve summing the performance of all the trials now in the fitness trial history of the server-centric version of the individual, and dividing the sum by the experience level 314. Preferably, the resulting overall fitness estimate is then further weighted by a factor that depends on a characteristic of the fitness trial history of the server-centric version of the individual as previously set forth.

Figure 11:
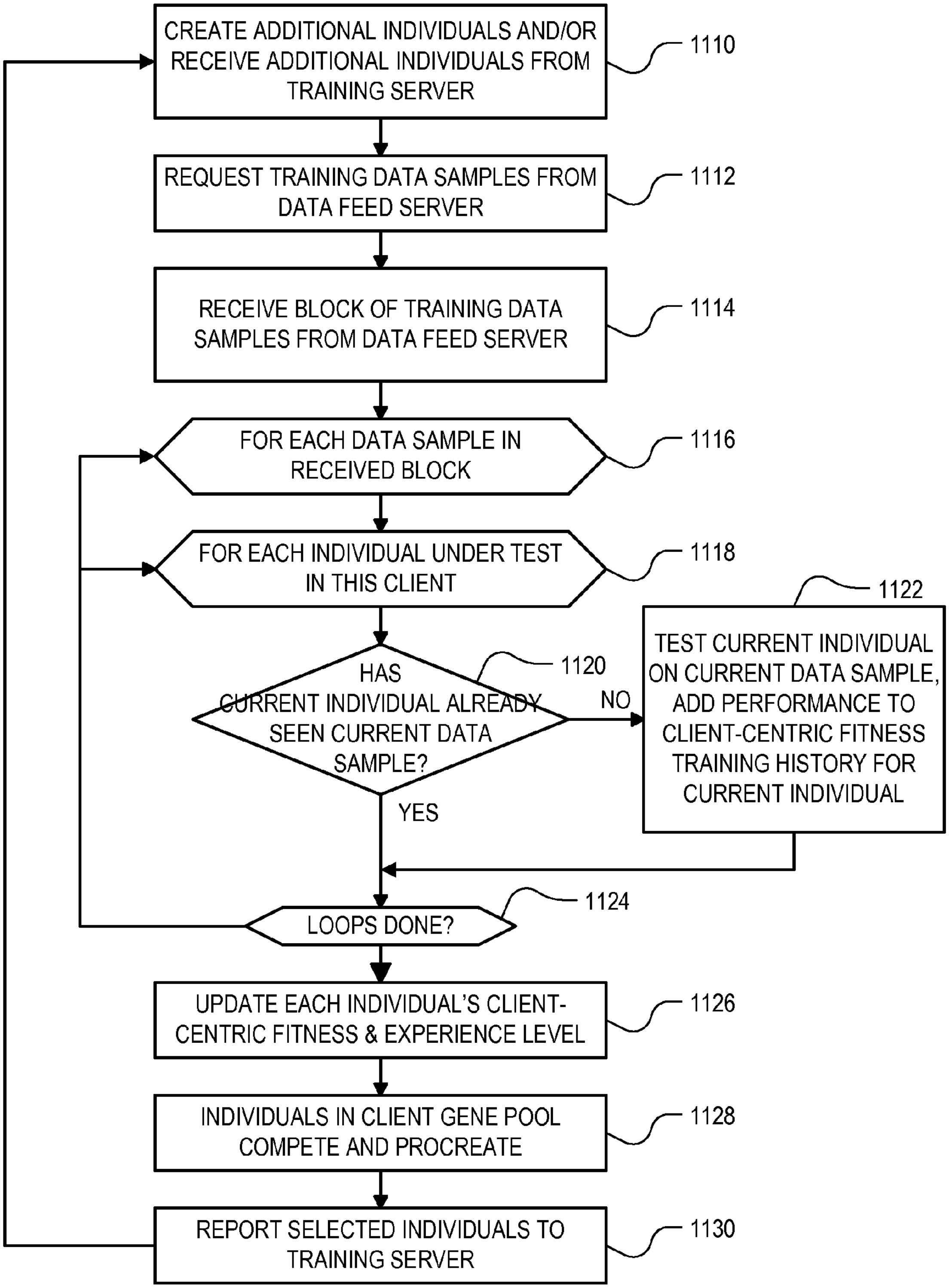
FIG. 11 is a flow chart illustrating steps performed by a representative one of the clients in FIG. 8.

FIG. 11 is a flow chart illustrating a method used in one embodiment for the selection of data samples for testing on various individuals. In this embodiment, samples of training data are delivered by the data feed server 830 to each of the clients 820 upon request by the clients, and without attempting to avoid duplicate testing. The samples may be delivered in blocks or individually in various embodiments. In one embodiment, the data feed server 830 selects training data samples for delivery in a random or pseudo-random sequence, whereas in another embodiment it selects training data samples in sequential round-robin sequence or in some other fixed and pre-determined sequence. Other variations will be apparent.

FIG. 11 illustrates acts performed by a representative one of the clients 820. As with all flow charts herein, it will be appreciated that some of the acts described in FIG. 11 can be combined, operated in parallel or in a different sequence than that shown in the drawing without affecting the functions achieved. In step 1110, the client either creates new individuals randomly or otherwise, or it receives additional individuals from the training server 810, or both. It may also have individuals already existing in the client-centric pool that are to undergo further testing. In step 1112 the client requests training data samples from the data feed server 830, and in step 1114 it receives a block of such samples. A block might consist of a single sample or multiple samples in various embodiments. In step 1116, the client 820 loops through the data samples in the received block, and in step 1118, a nested manner, it then loops through all of the individuals in the client's gene pool that are undergoing training In step 1120, the client determines whether the current individual has already been tested on the current data sample, so far as is known by the particular client. The client makes this determination by searching for the ID of the current data sample in the fitness trial history of the client-centric version of the current individual. If it is found, then the current individual has already been tested on the current data sample, and resources can be conserved by not re-doing the trial. If it is not found, then so far as is known by the particular client, the current individual has not yet been tested on the current data sample. Such a trial may have been performed by a different client, in which case the test by the present client will be duplicative. But the step of searching through the fitness trial history of the client-centric version of the current individual is still beneficial because it will still avoid duplicate testing of some individuals on some test data samples.

Only if the current individual has not already been tested on the current data sample, so far as is known by the particular client, then that trial is performed in step 1122. The current data sample ID and the resulting performance of the current individual on that data sample is then recorded in the fitness trial history for the client-centric version of the current individual. The client then loops back to consider the next individual under test with respect to the current test data sample, or if all such individuals have been considered, it loops back to consider the next data sample in the received block. (Step 1124). In one embodiment, the testing in step 1122 completes before the flow proceeds to step 1124 to loop back to consider the next data sample. In another embodiment, step 1122 does not necessarily complete prior to step 1124. Instead, step 1122 can involve adding the individual and the sample ID to a queue which the client will test in a different thread or process.

After all the data samples have been considered with respect to all the individuals under test, in step 1126, each individual's client-centric fitness estimate and experience level are updated. In appropriate embodiments, this step can include weighting some or all of the fitness estimates in dependence upon a desired or undesired characteristic of the fitness trial history of the particular individual, as determined from the client-centric fitness trial history. In step 1128 the individuals in the client gene pool compete with other as previously described, and procreate as previously described. In step 1130, certain individuals from the client-centric gene pool may be selected as previously described and reported to the training server 810. The client then returns to step 1110 for additional individuals.

Note that whereas the illustration in FIG. 11 receives data samples and then chooses which individuals to evaluate on such samples, another embodiment could affirmatively request specific data samples on which the client knows (to the extent of its local fitness training histories) the individual has not already seen. Many other variations will be apparent.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A data mining system, for use with a data mining training database containing a plurality of data samples, comprising:

a computer system having a memory having a candidate gene database identifying a pool of candidate individuals, each of the candidate individuals identifying a plurality of conditions and at least one corresponding proposed output in dependence upon the conditions, a gene pool processor which:

tests each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

stores, in association with each of the candidate individuals in the testing subset, a respective first history identifying the data samples on which the respective individual has been tested; and calculates an overall fitness estimate for each of the individuals in the testing subset, in dependence upon the results proposed by the respective individual when the conditions of the respective individual were applied to each of the data samples indicated in the first history associated with the respective individual, the gene pool processor further including a competition module which selects individuals for discarding in dependence upon comparisons among their respective overall fitness estimates, the computer system further having a gene harvesting module providing for deployment selected ones of the remaining individuals from the pool of candidate individuals.

2. The system according to claim 1, wherein the testing performed by the gene pool processor of each individual in a testing subset comprises testing in a manner which precludes testing each given individual in the testing subset from applying the conditions of the respective individual to any data sample already identified in the first history associated with the given individual.

3. The system according to claim 1, wherein the testing performed by the gene pool processor of each individual in a testing subset includes the computer system:

identifying, in dependence upon the first history associated with a given individual, a given data sample not already identified in the first history associated with the given individual;

retrieving the given data sample from the data mining training database; and testing the given individual on the given data sample.

4. The system according to claim 1, wherein the testing performed by the gene pool processor of each individual in a testing subset comprises the computer system:

receiving a block of at least one data sample;

determining in dependence upon the first history associated with a given individual whether each data sample in the block is already identified in the first history associated with the given individual; and testing the given individual on only those data samples in the block, if any, which are not already identified in the first history associated with the given individual.

5. The system according to claim 1, wherein the gene pool processor, after storing a first history and before calculating an overall fitness estimate:

further tests a particular individual in the testing subset on at least one further data sample; and stores, in association with the particular individual a further history identifying each of the at least one further data sample, and wherein in calculating an overall fitness estimate, the gene pool processor:

determines a union of the data samples identified in the first history and in the further history, the union excluding all duplicate data samples;

forms, in dependence upon the union, a combined history which identifies the data samples on which the particular individual has been tested; and calculates the overall fitness estimate for the particular individual in dependence upon the results proposed by the particular individual when the conditions of the particular individual were applied to each of the data samples indicated in the combined history associated with the particular individual.

6. The system according to claim 5, wherein in determining a union and forming a combined history, collectively, the computer system, for each particular data sample identified in the further history:

determines whether the particular data sample is already identified in the first history associated with the particular individual; and adds an identification of the particular data sample to a history associated with the particular individual only if the particular data sample is not already identified in the first history associated with the particular individual.

7. The system according to claim 5, wherein in storing a first history, the gene pool processor stores, in association with each of the candidate individuals in the testing subset, the respective first history so as to identify both the data samples on which the respective individual has been tested and the performance of the respective individual on each of such data samples, wherein in forming a combined history, the gene pool processor forms, in dependence upon the union, the combined history so as to identify both the data samples on which the particular individual has been tested and the performance of the respective individual on each of such data samples, and wherein in calculating the overall fitness estimate for the particular individual the gene pool processor calculates the overall fitness estimate for the particular individual in dependence upon the performance indications in the combined fitness history.

8. The system according to claim 1, wherein in selecting individuals for discarding in dependence upon comparisons among their respective overall fitness estimates, the gene pool processor selects the individuals for discarding in further dependence upon a characteristic of the individuals' first histories other than their respective overall fitness estimates.

9. The system according to claim 1, wherein in storing a first history, the gene pool processor stores, in association with each of the candidate individuals in the testing subset, the respective first history so as to identify both the data samples on which the respective individual has been tested and the performance of the respective individual on each of such data samples.

10. The system according to claim 9, wherein in the selection of individuals for discarding in dependence upon comparisons among their respective overall fitness estimates, the competition module selects the individuals for discarding in further dependence upon a characteristic of the individuals' first histories other than their respective overall fitness estimates.

11. The system according to claim 9, wherein in calculating an overall fitness estimate for each of the individuals in the testing subset, the gene pool processor calculates the overall fitness estimate for each particular one of the individuals in the testing subset in further dependence upon a characteristic of the first history associated with the particular individual other than an unweighted average performance of the particular individual.

12. The system according to claim 9, wherein in calculating an overall fitness estimate for each of the individuals in the testing subset the gene pool processor:

calculates a preliminary fitness estimate for each particular one of the individuals in the testing subset; and weights the preliminary fitness estimate for at least some of the individuals in the testing subset in dependence upon an additional characteristic of the first history associated with the particular individual.

13. The system according to claim 12, wherein in weighting the preliminary fitness estimate for at least some of the individuals in the testing subset, the gene pool processor weights the preliminary fitness estimate for only those of the individuals in the testing subset which have been tested on at least a predetermined number $N>1$ of data samples.

14. The system according to claim 12, wherein the memory further includes data identifying layer parameters for a number $T>0$ of gene pool experience layers $L_1$-$L_T$ in an elitist pool, the layer parameters for each i'th one of the layers $L_1$-$L_T$ identifying a respective minimum testing experience level $ExpMin(L_i)$ for the layer, $ExpMin(L_1)>1$ and, if $T>1$, $ExpMin(L_i)>ExpMin(L_{i-1})$ for each $i>1$, and wherein in weighting the preliminary fitness estimate for at least some of the individuals in the testing subset, the gene pool processor weights the preliminary fitness estimate for only those of the individuals in the testing subset which have been tested on at least a predetermined number N of data samples, where N is equal to one of the $ExpMin(L_i)$.

15. The system according to claim 12, wherein in selecting individuals for discarding in dependence upon comparisons among their respective overall fitness estimates, the competition module selects individuals for discarding in dependence upon comparisons among their respective weighted fitness estimates.

16. The system according to claim 12, wherein in providing for deployment of selected ones of the remaining individuals from the pool of candidate individuals, the gene harvesting module provides for deployment individuals from the pool of candidate individuals selected in dependence upon comparisons among their respective weighted fitness estimates.

17. The system according to claim 9, wherein in selecting individuals for discarding in dependence upon comparisons among their respective overall fitness estimates, the gene pool processor selects the individuals for discarding in further dependence upon a comparison of a particular characteristic of one individual's first history other than its overall fitness estimate, with the particular characteristic of a different individual's first history.

18. The system according to claim 9, wherein in providing for deployment of selected ones of the remaining individuals from the pool of candidate individuals, the gene harvesting module selects for deployment individuals from the pool of candidate individuals in dependence upon an additional characteristic of the first histories associated with the individuals in the pool of candidate individuals.

19. The system according to claim 1, wherein each of the data samples in the training database indicates historical market data at a plurality of times in a trading day, including the price of a security at the plurality of times, wherein each individual indicates a plurality of conditions resolvable in dependence upon the data in a given one of the samples, the outputs identified by the individuals including security trading instructions, wherein in testing each individual in a testing subset, for each trial of a given one of the individuals being tested, the gene pool processor hypothetically performs all the trading instructions made by the given individual on a respective given one of the samples throughout the trading day of the given sample, and wherein in calculating an overall fitness estimate, the gene pool processor updates the fitness estimate associated with the given individual in dependence upon the given individual's profit or loss for the trading day of the given sample.

20. The system according to claim 1, wherein the computer system comprises a server and a collection of at least one client device, and wherein in testing each individual in a testing subset of at least one of the candidate individuals:

the server delegates the testing to the client devices, including the server delegating testing of a first one of the individuals in the testing subset to a first one of the client devices and receiving back the first individual, in association with a first client-centric history identifying the data samples on which the first individual has been tested and the performance of the first individual on each of such data samples, the first client-centric history including at least all the data samples on which the first individual has been tested by the first client device;

and wherein in storing, in association with each of the candidate individuals in the testing subset, the gene pool processor updates a server-centric history associated with the first individual to identify the data samples and the performance indications from the first client-centric history received back from the first client device.

21. The system according to claim 20, wherein the server, after delegating testing of the first individual to the first client device and before updating a server-centric history associated with the first individual:

delegates to a second one of the client devices additional testing of the first individual; and receives back the first individual from the second server, in association with a second client-centric history identifying a second subset of at least one of the data samples in the training database on which the first individual has been tested by the second client device and the performance of the first individual on each of such data samples in the second subset, the second client-centric history including at least all the data samples on which the first individual has been tested by the second client device, wherein in storing, in association with each of the candidate individuals in the testing subset, the server updates the server-centric history associated with the first individual to identify the data samples and the performance indications from both the first and second client-centric histories, and in updating the server-centric history, the server:

determines a union of the data samples identified in the first and second histories, the union excluding all duplicate data samples; and forms the first history for the first individual in dependence upon the union.

22. A client computer system for a data mining system, for use with a data mining training database containing a plurality of data samples, comprising:

a processing subsystem;

a memory having a candidate gene database identifying a client-centric pool of candidate individuals, each of the candidate individuals identifying a plurality of conditions and at least one corresponding proposed output in dependence upon the conditions, a client gene pool processor which:

tests each individual in a testing subset of at least one of the candidate individuals, each of the tests applying the conditions of the respective individual to a respective subset of the data samples in the training database to propose a result, each individual in the testing subset being tested on at least one data sample, the testing being performed in a manner that precludes testing each given individual in the testing subset from applying the conditions of the respective individual to any data sample already identified in the first history associated with the given individual;

stores, in association with each of the candidate individuals in the testing subset, a respective first history identifying the data samples on which the respective individual has been tested, at least so far as is known by the computer system; and calculates an client-centric overall fitness estimate for each of the individuals in the testing subset, in dependence upon the results proposed by the respective individual when the conditions of the respective individual were applied to each of the data samples indicated in the first history associated with the respective individual, the client computer system further including a competition module which selects individuals for discarding in dependence upon comparisons among their respective client-centric overall fitness estimates; and the client computer system further including a gene harvesting module which forwards to a central server infrastructure for potential deployment or further testing, selected ones of the remaining individuals from the client-centric pool of candidate individuals.

23. The system according to claim 22, wherein in testing each individual in a testing subset, the client gene pool processor:

identifies, in dependence upon the first history associated with a given individual, a given data sample not already identified in the first history associated with the given individual;

retrieves the given data sample from the data mining training database; and tests the given individual on the given data sample.

24. The system according to claim 22, wherein in testing each individual in a testing subset, the client gene pool processor:

receives a block of at least one data sample;

determines in dependence upon the first history associated with a given individual whether each data sample in the block is already identified in the first history associated with the given individual; and tests the given individual on only those data samples in the block, if any, which are not already identified in the first history associated with the given individual.

25. The system according to claim 22, wherein in storing, the client gene pool processor stores, in association with each of the candidate individuals in the testing subset, the respective first history so as to identify both the data samples on which the respective individual has been tested and the performance of the respective individual on each of such data samples.

26. The system according to claim 25, wherein in selecting individuals for discarding in dependence upon comparisons among their respective overall fitness estimates, the competition module selects the individuals for discarding in further dependence upon a characteristic of the individuals' first histories other than their respective overall fitness estimates.

27. A computer-implemented data mining method, for use with a data mining training database containing a plurality of data samples, comprising the steps of:

providing a computer system having a memory having a candidate gene database identifying a pool of candidate individuals, each of the candidate individuals identifying a plurality of conditions and at least one corresponding proposed output in dependence upon the conditions, the computer system testing each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

storing, in association with each of the candidate individuals in the testing subset, a respective first history identifying the data samples on which the respective individual has been tested;

calculating an overall fitness estimate for each of the individuals in the testing subset, in dependence upon the results proposed by the respective individual when the conditions of the respective individual were applied to each of the data samples indicated in the first history associated with the respective individual;

the computer system selecting individuals for discarding in dependence upon comparisons among their respective overall fitness estimates; and providing for deployment of selected ones of the remaining individuals from the pool of candidate individuals.

28. The method according to claim 27, wherein the step of the computer system testing each individual in a testing subset comprises performing a step which precludes testing each given individual in the testing subset from applying the conditions of the respective individual to any data sample already identified in the first history associated with the given individual.

29. The method according to claim 27, further comprising the steps, after the step of storing a first history and before the step of calculating an overall fitness estimate, of:

further testing a particular individual in the testing subset on at least one further data sample; and storing, in association with the particular individual a further history identifying each of the at least one further data sample, and wherein the step of calculating an overall fitness estimate comprises the steps of:

determining a union of the data samples identified in the first history and in the further history, the union excluding all duplicate data samples;

forming, in dependence upon the union, a combined history which identifies the data samples on which the particular individual has been tested; and calculating the overall fitness estimate for the particular individual in dependence upon the results proposed by the particular individual when the conditions of the particular individual were applied to each of the data samples indicated in the combined history associated with the particular individual.

30. The method according to claim 29, wherein the step of storing comprises the step of storing, in association with each of the candidate individuals in the testing subset, the respective first history so as to identify both the data samples on which the respective individual has been tested and the performance of the respective individual on each of such data samples, wherein the step of forming a combined history comprises the step of forming, in dependence upon the union, the combined history so as to identify both the data samples on which the particular individual has been tested and the performance of the respective individual on each of such data samples, and wherein the step of calculating the overall fitness estimate for the particular individual comprises calculating the overall fitness estimate for the particular individual in dependence upon the performance indications in the combined fitness history.

31. The method according to claim 27, wherein the step of the computer system selecting individuals for discarding in dependence upon comparisons among their respective overall fitness estimates, selects the individuals for discarding in further dependence upon a characteristic of the individuals' first histories other than their respective overall fitness estimates.

32. The method according to claim 27, wherein the step of storing comprises the step of storing, in association with each of the candidate individuals in the testing subset, the respective first history so as to identify both the data samples on which the respective individual has been tested and the performance of the respective individual on each of such data samples.

33. The method according to claim 32, wherein the step of calculating an overall fitness estimate for each of the individuals in the testing subset comprises the steps of:

calculating a preliminary fitness estimate for each particular one of the individuals in the testing subset; and weighting the preliminary fitness estimate for only those of the individuals in the testing subset which have been tested on at least a predetermined number $N>1$ of data samples, in dependence upon an additional characteristic of the first history associated with the particular individual, and wherein the step of selecting individuals for discarding in dependence upon comparisons among their respective overall fitness estimates comprises selecting individuals for discarding in dependence upon comparisons among their respective weighted fitness estimates.

34. The method according to claim 32, wherein the step of calculating an overall fitness estimate for each of the individuals in the testing subset comprises the steps of:

calculating a preliminary fitness estimate for each particular one of the individuals in the testing subset; and weighting the preliminary fitness estimate for at least some of the individuals in the testing subset in dependence upon an additional characteristic of the first history associated with the particular individual, and wherein the step of providing for deployment of selected ones of the remaining individuals from the pool of candidate individuals, comprises the step of providing for deployment individuals from the pool of candidate individuals selected in dependence upon comparisons among their respective weighted fitness estimates.

35. The method according to claim 27, wherein the computer system comprises a server and a collection of at least one client device, and wherein the step of testing comprises the steps of:

the server delegating the testing to the client devices, including delegating testing of a first one of the individuals in the testing subset to a first one of the client devices; and after the first client device has tested the first individual on at least one data sample, the server receiving back the first individual, in association with a first client-centric history identifying the data samples on which the first individual has been tested and the performance of the first individual on each of such data samples, the first client-centric history including at least all the data samples on which the first individual has been tested by the first client device, and wherein the step of storing, in association with each of the candidate individuals in the testing subset, a respective first history identifying the data samples on which the respective individual has been tested, comprises the step of updating a server-centric history associated with the first individual to identify the data samples and the performance indications from the first client-centric history received back from the first client device.

36. The method according to claim 35, further comprising the steps of:

the server, after delegating testing of the first individual to the first client device and before updating a server-centric history associated with the first individual, delegating to a second one of the client devices additional testing of the first individual, the second client device testing the first individual on a second subset of at least one of the data samples in the training database to propose results; and the server receiving back the first individual from the second server, in association with a second client-centric history identifying the data samples on which the first individual has been tested by the second client device and the performance of the first individual on each of such data samples, the second client-centric history including at least all the data samples on which the first individual has been tested by the second client device, wherein the step of storing, in association with each of the candidate individuals in the testing subset comprises the step of updating the server-centric history associated with the first individual to identify the data samples and the performance indications from both the first and second client-centric histories, and wherein the step of updating the server-centric history comprises the steps of:

determining a union of the data samples identified in the first and second histories, the union excluding all duplicate data samples; and forming the first history for the first individual in dependence upon the union.

37. A computer-implemented data mining method, for use with a data mining training database containing a plurality of data samples, comprising the steps of:

providing a computer system having a memory having a candidate gene database identifying a pool of candidate individuals, each of the candidate individuals identifying a plurality of conditions and at least one corresponding proposed output in dependence upon the conditions, the computer system testing each individual in a testing subset of at least one of the candidate individuals, each of the tests applying the conditions of the respective individual to a respective subset of the data samples in the training database to propose a result, each individual in the testing subset being tested on at least one data sample, the testing being performed in a manner that precludes testing each given individual in the testing subset from applying the conditions of the respective individual to any data sample already identified in the first history associated with the given individual;

storing, in association with each of the candidate individuals in the testing subset, a respective first history identifying the data samples on which the respective individual has been tested, at least so far as is known by the computer system;

calculating an overall computer system-centric fitness estimate for each of the individuals in the testing subset, in dependence upon the results proposed by the respective individual when the conditions of the respective individual were applied to each of the data samples indicated in the first history associated with the respective individual;

the computer system selecting individuals for discarding in dependence upon comparisons among their respective overall fitness estimates; and forwarding to a central server infrastructure for potential deployment or further testing, selected ones of the remaining individuals from the pool of candidate individuals.

38. The method according to claim 37, wherein the step of storing comprises the step of storing, in association with each of the candidate individuals in the testing subset, the respective first history so as to identify both the data samples on which the respective individual has been tested and the performance of the respective individual on each of such data samples.

39. The method according to claim 38, wherein the step of the computer system selecting individuals for discarding in dependence upon comparisons among their respective overall fitness estimates, selects the individuals for discarding in further dependence upon a characteristic of the individuals' first histories other than their respective overall fitness estimates.

40. The method according to claim 37, wherein the step of the computer system testing each individual in a testing subset comprises the steps of:

the computer system identifying, in dependence upon the first history associated with a given individual, a given data sample not already identified in the first history associated with the given individual;

retrieving the given data sample from the data mining training database; and testing the given individual on the given data sample.

41. The method according to claim 37, wherein the step of the computer system testing each individual in a testing subset comprises the steps of:

the computer system receiving a block of at least one data sample;

determining in dependence upon the first history associated with a given individual whether each data sample in the block is already identified in the first history associated with the given individual; and testing the given individual on only those data samples in the block, if any, which are not already identified in the first history associated with the given individual.

42. The method according to claim 27, wherein the step of the computer system testing each individual in a testing subset comprises the steps of:

the computer system identifying, in dependence upon the first history associated with a given individual, a given data sample not already identified in the first history associated with the given individual;

retrieving the given data sample from the data mining training database; and testing the given individual on the given data sample.

43. The method according to claim 27, wherein the step of the computer system testing each individual in a testing subset comprises the steps of:

receiving a block of at least one data sample;

determining in dependence upon the first history associated with a given individual whether each data sample in the block is already identified in the first history associated with the given individual; and testing the given individual on only those data samples in the block, if any, which are not already identified in the first history associated with the given individual.

44. The method according to claim 29, wherein the steps of determining a union and forming a combined history collectively comprise the step of, for each particular data sample identified in the further history:

determining whether the particular data sample is already identified in the first history associated with the particular individual; and adding an identification of the particular data sample to a history associated with the particular individual only if the particular data sample is not already identified in the first history associated with the particular individual.

45. The method according to claim 32, wherein the step of the computer system selecting individuals for discarding in dependence upon comparisons among their respective overall fitness estimates, selects the individuals for discarding in further dependence upon a characteristic of the individuals' first histories other than their respective overall fitness estimates.

46. The method according to claim 32, wherein the step of calculating an overall fitness estimate for each of the individuals in the testing subset comprises the step of calculating the overall fitness estimate for each particular one of the individuals in the testing subset in further dependence upon a characteristic of the first history associated with the particular individual other than an un-weighted average performance of the particular individual.

47. The method according to claim 32, wherein the step of calculating an overall fitness estimate for each of the individuals in the testing subset comprises the steps of:

calculating a preliminary fitness estimate for each particular one of the individuals in the testing subset; and weighting the preliminary fitness estimate for at least some of the individuals in the testing subset in dependence upon an additional characteristic of the first history associated with the particular individual.

48. The method according to claim 47, wherein the step of weighting the preliminary fitness estimate for at least some of the individuals in the testing subset comprises the step of weighting the preliminary fitness estimate for only those of the individuals in the testing subset which have been tested on at least a predetermined number N>1 of data samples.

49. The method according to claim 47, further comprising the step of providing in the memory data identifying layer parameters for a number T>0 of gene pool experience layers $L_1$-$L_T$ in an elitist pool, the layer parameters for each i'th one of the layers $L_1$-$L_T$ identifying a respective minimum testing experience level ExpMin($L_i$) for the layer, ExpMin($L_1$)>1 and, if T>1, ExpMin($L_i$)>ExpMin($L_{i-1}$) for each i>1, and wherein the step of weighting the preliminary fitness estimate for at least some of the individuals in the testing subset comprises the step of weighting the preliminary fitness estimate for only those of the individuals in the testing subset which have been tested on at least a predetermined number N of data samples, where N is equal to one of the ExpMin($L_i$).

50. The method according to claim 32, wherein the step of the computer system selecting individuals for discarding in dependence upon comparisons among their respective overall fitness estimates, selects the individuals for discarding in further dependence upon a comparison of a particular characteristic of one individual's first history other than its overall fitness estimate, with the particular characteristic of a different individual's first history.

51. The method according to claim 32, wherein the step of providing for deployment of selected ones of the remaining individuals from the pool of candidate individuals, comprises the step of selecting for deployment individuals from the pool of candidate individuals in dependence upon an additional characteristic of the first histories associated with the individuals in the pool of candidate individuals.

52. The method according to claim 27, further comprising, after the step of selecting and before the step of providing for deployment, a procreation step of forming new individuals in the pool at least in part by copying into each subject new individual at least one member of the group consisting of: a condition in an individual in a set of at least one parent individual corresponding to the subject new individual; and an output in an individual in the set of parent individuals corresponding to the subject new individual, and further comprising, after the procreation step and before the step of providing for deployment, repeating the steps of testing, storing, calculating and selecting at least once.

53. The method according to claim 27, wherein each of the data samples in the training database indicates historical market data at a plurality of times in a trading day, including the price of a security at the plurality of times, wherein each individual indicates a plurality of conditions resolvable in dependence upon the data in a given one of the samples, the outputs identified by the individuals including security trading instructions, wherein the step of testing comprises the step of, for each trial of a given one of the individuals being tested, hypothetically performing all the trading instructions made by the given individual on a respective given one of the samples throughout the trading day of the given sample, and wherein the step of calculating an overall fitness estimate comprises the step of updating the fitness estimate associated with the given individual in dependence upon the given individual's profit or loss for the trading day of the given sample.

* * * * *